United States Patent
Youngblood et al.

(10) Patent No.: US 9,252,891 B2
(45) Date of Patent: Feb. 2, 2016

(54) DIE-TO-DIE COMMUNICATION LINKS FOR RECEIVER INTEGRATED CIRCUIT DIES AND RELATED METHODS

(71) Applicant: Silicon Laboratories Inc., Austin, TX (US)

(72) Inventors: John B. Youngblood, Austin, TX (US); Guner Arslan, Austin, TX (US); J. A. Bolton, Round Rock, TX (US); Trenton J. Grale, Austin, TX (US); Vitor Pereira, Austin, TX (US); Jeffrey A. Tindle, Austin, TX (US); David S. Trager, Buda, TX (US); Yan Zhou, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 14/575,391

(22) Filed: Dec. 18, 2014

(65) Prior Publication Data

US 2015/0126128 A1    May 7, 2015

Related U.S. Application Data

(63) Continuation-in-part of application No. 14/074,355, filed on Nov. 7, 2013.

(51) Int. Cl.
*H04B 1/10* (2006.01)
*H04B 15/00* (2006.01)

(52) U.S. Cl.
CPC .................................... *H04B 15/00* (2013.01)

(58) Field of Classification Search
CPC .... H04B 1/1036; H04B 1/7107; H04B 1/707; H04B 15/04; H04B 15/00; H04L 27/2647
See application file for complete search history.

(56) References Cited

U.S. PATENT DOCUMENTS

| | | | |
|---|---|---|---|
| 6,151,488 | A | 11/2000 | Brekelmans |
| 7,002,639 | B2 | 2/2006 | Kawai |
| 7,167,694 | B2 | 1/2007 | Khoini-Poorfard et al. |
| 7,272,373 | B2 | 9/2007 | Tuttle et al. |
| 7,447,491 | B2 | 11/2008 | Khoini-Poorfard |
| 7,471,940 | B2 | 12/2008 | Tuttle et al. |
| 7,627,297 | B2 | 12/2009 | Nam |
| 7,783,259 | B2 | 8/2010 | Dessert et al. |
| 8,200,181 | B1 | 6/2012 | Khlat et al. |

(Continued)

OTHER PUBLICATIONS

Patent Application, Djadi et al., "Systems and Methods Using Multiple Inter-Chip (IC) Links for Antenna Diversity and/or Debug", U.S. Appl. No. 14/340,004, filed Jul. 24, 2014, 50 pgs.

*Primary Examiner* — Syed Haider
(74) *Attorney, Agent, or Firm* — Egan, Peterman & Enders LLP.

(57) ABSTRACT

Die-to-die communication links for receiver integrated circuit dies within multi-die systems and related methods are disclosed for radio frequency (RF) receivers. The disclosed embodiments provide die-to-die communication links that allow for direct communication of operating parameters between receiver integrated circuit dies and other integrated circuit dies within a multi-die system so that the operation of receive path circuitry can be adjusted without requiring intervention from an external host processor integrated circuit. A variety of operating parameter information can be communicated through the die-to-die communication links so that the integrated circuit dies can quickly adjust to changing signal conditions without requiring intervention by the external host processor integrated circuit.

24 Claims, 10 Drawing Sheets

(56) References Cited

U.S. PATENT DOCUMENTS

| | | |
|---|---|---|
| 8,290,100 B2 | 10/2012 | Komninakis et al. |
| 8,320,858 B2 | 11/2012 | Ruelke et al. |
| 8,331,887 B2 | 12/2012 | Tuttle et al. |
| 8,427,366 B2 | 4/2013 | Ganeshan et al. |
| 8,548,031 B2 | 10/2013 | Djadi et al. |
| 9,160,465 B2 | 10/2015 | Arslan et al. |
| 2005/0243217 A1* | 11/2005 | Yun et al. .................. 348/725 |
| 2006/0269004 A1* | 11/2006 | Ibrahim ............ H04L 25/03159 375/260 |
| 2007/0116148 A1* | 5/2007 | Lowe et al. .................. 375/316 |
| 2007/0153878 A1 | 7/2007 | Filipovic |
| 2007/0268170 A1* | 11/2007 | Danzig ............... H03M 1/0614 341/144 |
| 2007/0298730 A1* | 12/2007 | Tandy .................... 455/90.3 |
| 2010/0214145 A1* | 8/2010 | Narasimhan ........ H03M 1/1042 341/155 |
| 2011/0007839 A1 | 1/2011 | Tang et al. |
| 2011/0158298 A1 | 6/2011 | Djadi et al. |
| 2012/0099625 A1 | 4/2012 | Djadi et al. |
| 2013/0196609 A1* | 8/2013 | Ancora et al. .................. 455/78 |

* cited by examiner

DIE-TO-DIE COMMUNICATION LINKS FOR RECEIVER INTEGRATED CIRCUIT DIES AND RELATED METHODS

RELATED APPLICATIONS

This application is a continuation-in-part application of U.S. patent application Ser. No. 14/074,355, filed Nov. 7, 2013, and entitled "SPUR CANCELLATION SYSTEMS AND RELATED METHODS," which is hereby incorporated by reference in its entirety.

TECHNICAL FIELD

The disclosed embodiments relate to radio frequency (RF) receivers and, more particularly, to the operation of spur cancellation systems within such RF receivers.

BACKGROUND

Current radio frequency (RF) receiver integrated circuits (ICs) often convert analog signals associated with broadcast channels to digital information and then perform digital processing on this digital information to generate digital data associated with a selected channel. As part of this digital processing, digital clocks are utilized to operate analog-to-digital converters and digital processing blocks. These digital clocks, however, can generate undesirable spurs at frequencies within the broadcast channels being tuned. Frequency planning can be used to adjust digital clock frequencies among a number of specific pre-determined clock frequencies to cause such interfering spurs to fall outside the frequency range for the channel to be tuned. However, this frequency planning can be difficult to achieve, and where multiple receive paths are included in close proximity such as within a single integrated circuit or within a multi-chip package so that multiple different channels can be tuned at the same time, frequency planning can become practically impossible to achieve for certain combinations of channels and digital clock spurs being selected and generated by the digital clocks associated with the different receive paths.

A host processor integrated circuit (IC) is often used to provide operational commands to an RF receiver integrated circuit as part of a larger RF system. The RF system can also include a demodulator integrated circuit that demodulates the output signals provided by the receiver integrated circuit. The host processor IC can utilize information received from the receiver circuitry and/or the demodulator circuitry to control how the receiver circuitry and/or the demodulator circuitry operate within the larger RF system. However, these external communications and related control paths between the host integrated circuit and the receiver and/or demodulator integrated circuit can be relatively slow compared to the signal reception environment being experienced by the RF system. As such, it is often difficult for the host processor integrated circuit to adjust operation of the components within the RF system quickly enough to account for rapid changes in signal conditions. As such, overall performance of the RF system can be degraded. For example, where the RF information being tuned is audio information, the audio content can include undesirable pops/clicks or other undesirable artifacts. And where the RF information being tuned is video information, the video content can include freezes/glitches or other undesirable artifacts. These undesirable artifacts are preferably avoided to maintain an adequate user experience.

SUMMARY

Die-to-die communication links for receiver integrated circuit dies within multi-die systems and related methods are disclosed for radio frequency (RF) receivers. The disclosed embodiments provide die-to-die communication links that allow for direct communication of operating parameters between receiver integrated circuit dies and other integrated circuit dies within multi-die systems so that the operation of receive path circuitry can be adjusted without requiring intervention from an external host processor integrated circuit. A variety of operating parameter information can be communicated through the die-to-die communication links so that the integrated circuit dies can quickly adjust to changing signal conditions without requiring intervention by the external host processor integrated circuit. Other features and variations could also be implemented, as desired, and related systems and methods can be utilized, as well.

For one embodiment, a multi-die system having die-to-die communications is disclosed including a first integrated circuit die and a second integrated circuit die. The first integrated circuit die includes a radio frequency (RF) input configured to receive an RF input signal, receive path circuitry coupled to receive the RF input signal and configured to generate a tuned digital signal representing content of a channel within the RF input signal based upon a channel selection signal where the receive path circuitry includes analog front end circuitry and digital circuitry, a spur cancellation module within the digital circuitry configured to generate one or more spur cancellation signals for the receive path circuitry, a control module configured to provide one or more control signals to the spur cancellation module, and a first inter-die transmit and receive module configured to receive one or more operating parameters from a second integrated circuit die where the control module is further configured to adjust the one or more control signals for the spur cancellation module based upon the one or more operating parameters. The second integrated circuit die includes a second inter-die transmit and receive module configured to communicate the one or more operating parameters to the first inter-die transmit and receive module.

In further embodiments, the first integrated circuit die is included within a first integrated circuit package; the second integrated circuit die is included within a second integrated circuit package; and the first and second inter-die transmit and receive modules are coupled to each other through one or more electrical connections between the first and second integrated circuit packages. In other embodiments, the first and second integrated circuit dies are within a single multi-chip module, and the first and second inter-die transmit and receive modules are coupled to each other through one or more electrical connections within the multi-chip module.

In still further embodiments, the first integrated circuit die further includes a clock generator configured to generate one or more clock signals for the receive path circuitry based upon an oscillation signal, the first inter-die transmit and receive module is configured to communicate one or more operating parameters to the second inter-die transmit and receive module. And the second integrated circuit die further includes a second RF input configured to receive a second RF input signal, second receive path circuitry coupled to receive the second RF input signal and configured to generate a second tuned digital signal representing content of a channel within the second RF input signal based upon a second channel selection signal where the second receive path circuitry includes second analog front end circuitry and second digital circuitry, a second clock generator configured to generate one or more second clock signals for the second receive path circuitry based upon a second oscillation signal, a second spur cancellation module within the second digital circuitry configured to generate one or more second spur cancellation signals for the second receive path circuitry, and a second control module configured to provide one or more second control signals to the second spur cancellation module. The second inter-die transmit and receive module is further configured to receive the one or more operating parameters from the first integrated circuit die, and the second control module is further configured to adjust the one or more second control signals for the second spur cancellation module based upon the one or more operating parameters from the first integrated circuit die.

In other embodiments, the one or more operating parameters for each of the first and second integrated circuit dies includes at least one of channel selection information, clock frequency information for the first and second clock generators, or oscillation frequency information for the oscillation signals. In further embodiments, the receive path circuitry and the second receive path circuitry are configured for analog video signals, and the one or more operating parameters for each of the first and second integrated circuit dies comprises vertical synchronization information. Still further, the RF input signal and the second RF input signal can be the same.

In additional embodiments, the multi-die system further includes a first serial connection from the first inter-die transmit and receive module to the second inter-die transmit and receive module and a second serial connection from the second inter-die transmit and receive module to the first inter-die transmit and receive module. In other embodiments, the multi-die system further includes at least one bi-directional serial connection between the first inter-die transmit and receive module and the second inter-die transmit and receive module. Still further, the first and second integrated circuit dies can each include a plurality of spur cancellation modules.

In further embodiments, the first integrated circuit die include a plurality of cascaded spur cancellation modules. In addition, the plurality of cascaded cancellation modules can be configured to operate in a first mode of operation to cancel two spur frequencies or in a second mode of operation to cancel one spur frequency and adjust for real and imaginary path imbalances in spur levels. In additional embodiments, the second integrated circuit die includes at least one demodulator, and the one or more operating parameters include one or more control signals generated by the demodulator integrated circuit die based upon operation of the demodulator.

For another embodiment, method for die-to-die communication within a multi-die system is disclosed including at a first integrated circuit die receiving an RF input signal and a channel select signal, generating with receive path circuitry a tuned digital signal representing content of a channel within the RF input signal based upon the channel selection signal where the receive path circuitry includes analog front end circuitry and digital circuitry, generating one or more spur cancellation signals for the receive path circuitry using at least one spur cancellation module within the digital circuitry, providing one or more control signals to the spur cancellation module, receiving with first inter-die transmit and receive module one or more operating parameters from a second integrated circuit die, and adjusting the control signals provided to the spur cancellation module based upon the one or more operating parameters. And the method includes at a second integrated circuit die communicating with a second inter-die transmit and receive module the one or more operating parameters to the first inter-die transmit and receive module.

In further embodiments, the first integrated circuit die is included within a first integrated circuit package; the second integrated circuit die is included within a second integrated circuit package; and the first and second inter-die transmit and receive modules communicate through one or more electrical connections between the first and second integrated circuit packages. In other embodiments, the first and second integrated circuit dies are within a single multi-chip module, and the first and second inter-die transmit and receive modules communicate with each other through one or more electrical connections within the multi-chip module.

In still further embodiments, the method includes at the first integrated circuit die generating one or more clock signals for the receive path circuitry based upon an oscillation signal and communicating with the first inter-die transmit and receive module one or more operating parameters to the second inter-die transmit and receive module. And at the second integrated circuit die receiving a second RF input signal and a second channel select signal, generating with second receive path circuitry a second tuned digital signal representing content of a second channel within the second RF input signal based upon the second channel selection signal where the second receive path circuitry includes second analog front end circuitry and second digital circuitry, generating one or more second clock signals for the second receive path circuitry based upon a second oscillation signal, generating one or more second spur cancellation signals for the second receive path circuitry using at least one second spur cancellation module within the second digital circuitry, providing one or more second control signals to the second spur cancellation module, receiving with the second inter-die transmit and receive module operating parameters from a first integrated circuit die, and adjusting the second control signals provided to the second spur cancellation module based upon the one or more operating parameters from the first integrated circuit die.

In other embodiments, the one or more operating parameters for each of the first and second integrated circuit dies includes at least one of channel selection information, clock frequency information for the first and second clock generators, or oscillation frequency information for the oscillation signals. In further embodiments, the receive path circuitry and second receive path circuitry output tuned video channels, and the one or more operating parameters for each of the first and second integrated circuit dies comprises vertical synchronization information. Still further, the RF input signal and the second RF input signal are the same. In additional embodiments, the first and second integrated circuit dies each include a plurality of spur cancellation modules.

In further embodiments, the first integrated circuit die can include a plurality of cascaded spur cancellation modules. In addition, the method can further include selectably operating the plurality of cascaded cancellation modules in a first mode of operation to cancel two spur frequencies or in a second mode of operation to cancel one spur frequency and adjust for real and imaginary path imbalances in spur levels. In additional embodiments, the second integrated circuit die includes at least one demodulator, and the method further includes communicating one or more control signals generated by the demodulator integrated circuit die based upon operation of the demodulator as the one or more operating parameters.

Different or additional features, variations, and embodiments can be implemented, if desired, and related systems and methods can be utilized, as well.

DESCRIPTION OF THE DRAWINGS

It is noted that the appended drawings illustrate only exemplary embodiments and are, therefore, not to be considered

DETAILED DESCRIPTION

Die-to-die communication links for receiver integrated circuit dies within multi-die systems and related methods are disclosed for radio frequency (RF) receivers. The disclosed embodiments provide die-to-die communication links that allow for direct communication of operating parameters between receiver integrated circuit dies and other integrated circuit dies within a multi-die system so that the operation of receive path circuitry can be adjusted without requiring intervention from an external host processor integrated circuit. A variety of operating parameter information can be communicated through the die-to-die communication links so that the integrated circuit dies can quickly adjust to changing signal conditions without requiring intervention by the external host processor integrated circuit. Different features and variations can be implemented for the embodiments described herein, and related systems and methods can be utilized, as well.

For certain disclosed embodiments, receiver integrated circuit dies communicate operating parameters associated with spur cancellation modules through the die-to-die communication links. For example, operation of one or more spur cancellation modules within a first receiver integrated circuit die within a multi-die system can be adjusted rapidly based upon information received from a second receiver integrated circuit die through the die-to-die communication link. Similarly, operation of one or more spur cancellation modules within the second receiver die can be adjusted rapidly based upon information received from the first receiver die. As such, the spur cancellation modules can rapidly respond to changes within other receiver dies based upon operating parameters communicated through the die-to-die communication link without requiring intervention or communications with an external host processor integrated circuit. Further, the die-to-die communication links can also be used to communicate operating parameters between a receiver integrated circuit die and a demodulator integrated circuit die, for example, to adjust operation of the receiver die based upon operational conditions detected within the demodulator die. Still further, a receiver and a demodulator can be included within the same die, and the receiver/demodulator die can communicate operating parameters with other integrated circuit dies, such as other receiver dies, other receiver/demodulator dies, other demodulator dies, and/or dies containing other functional circuitry. Other variations can also be implemented while still taking advantage of the die-to-die communication links described herein.

Figure 6:
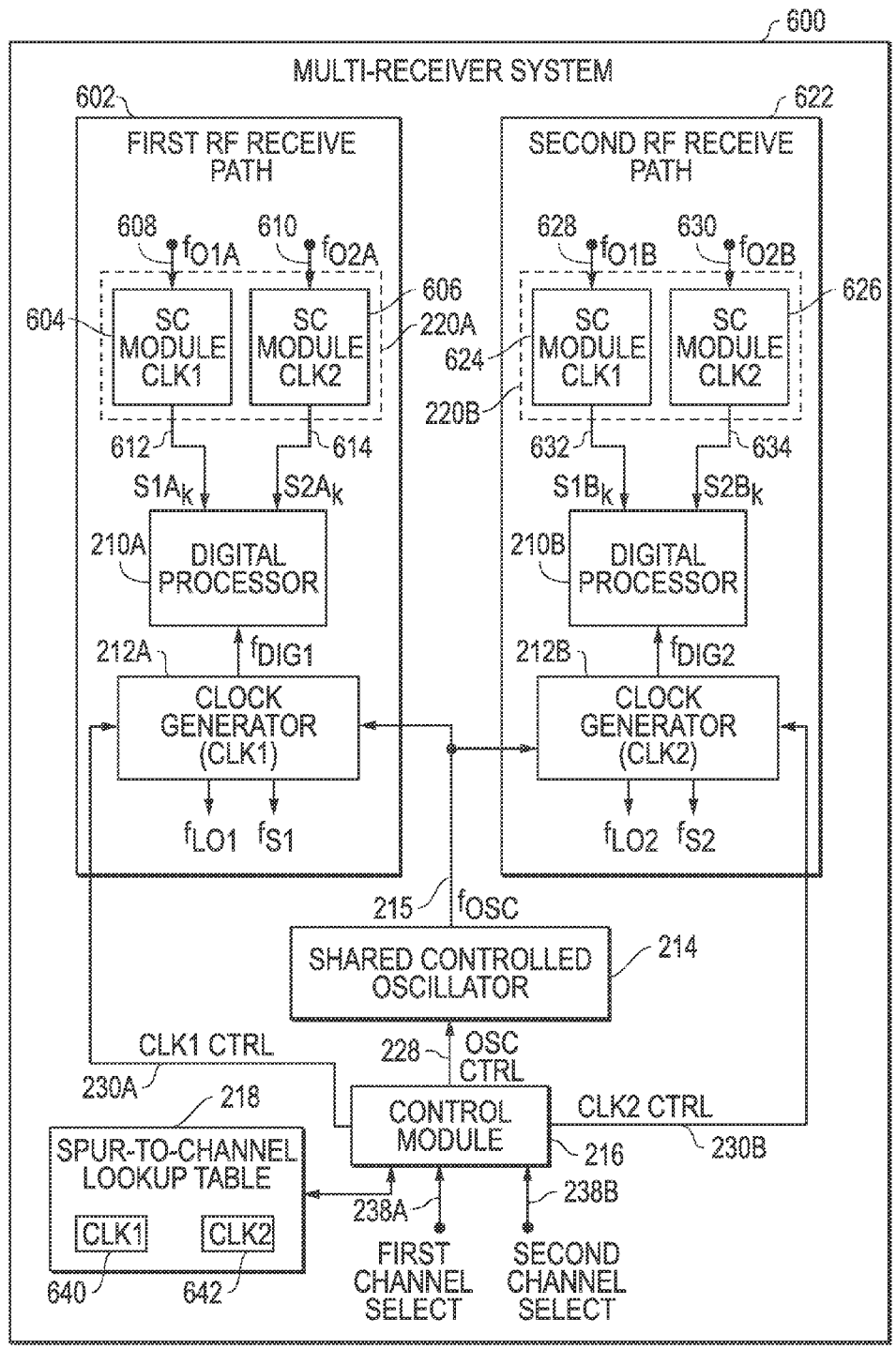
FIG. 6 is a block diagram of an example embodiment for a multi-receiver system that includes two receive paths and utilizes multiple spur cancellation modules per receive path.
Figure 7:
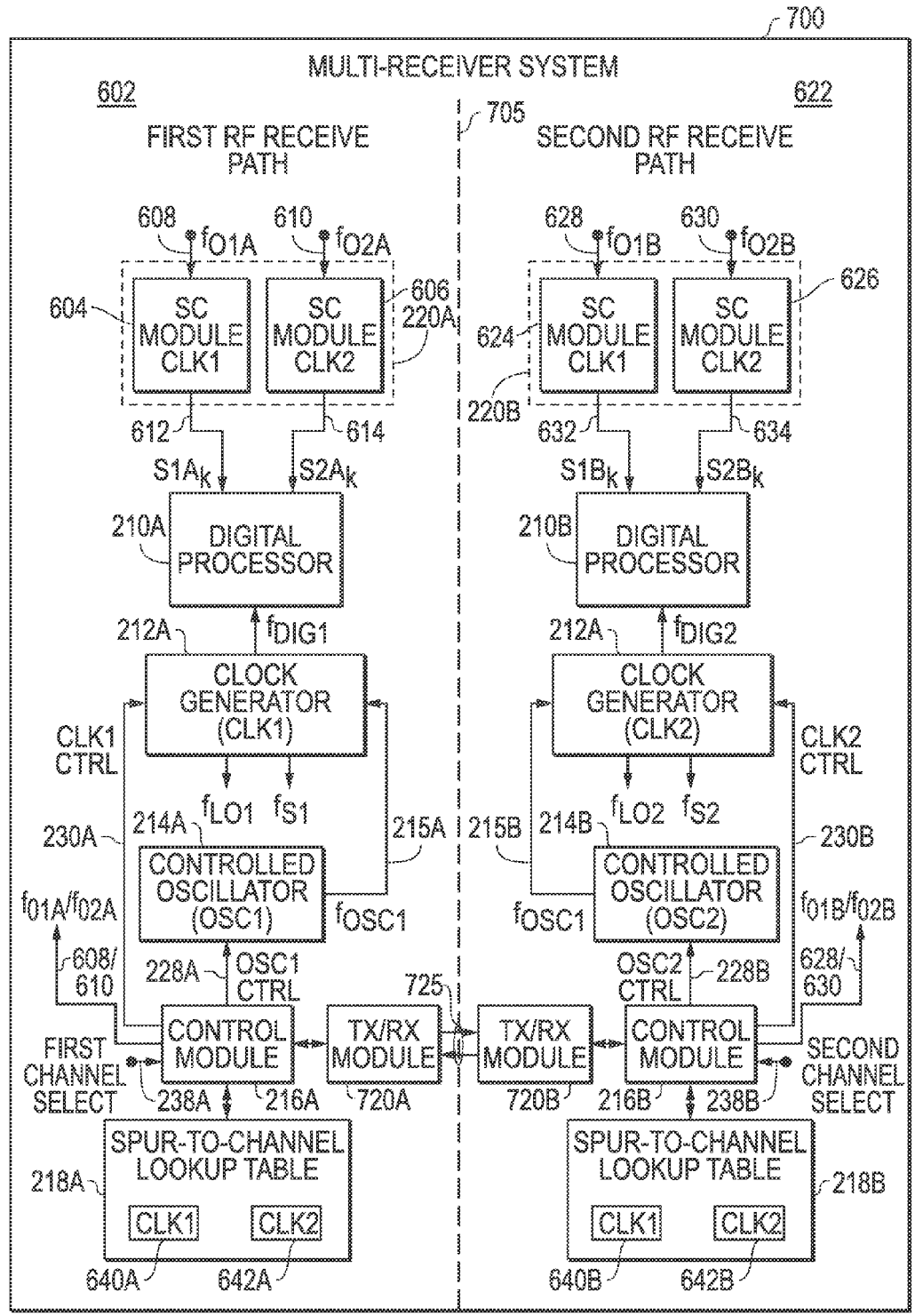
FIG. 7 is a block diagram of an example embodiment for a multi-receiver system that includes two receive paths and a communication link between the two receive paths.
Figure 8:
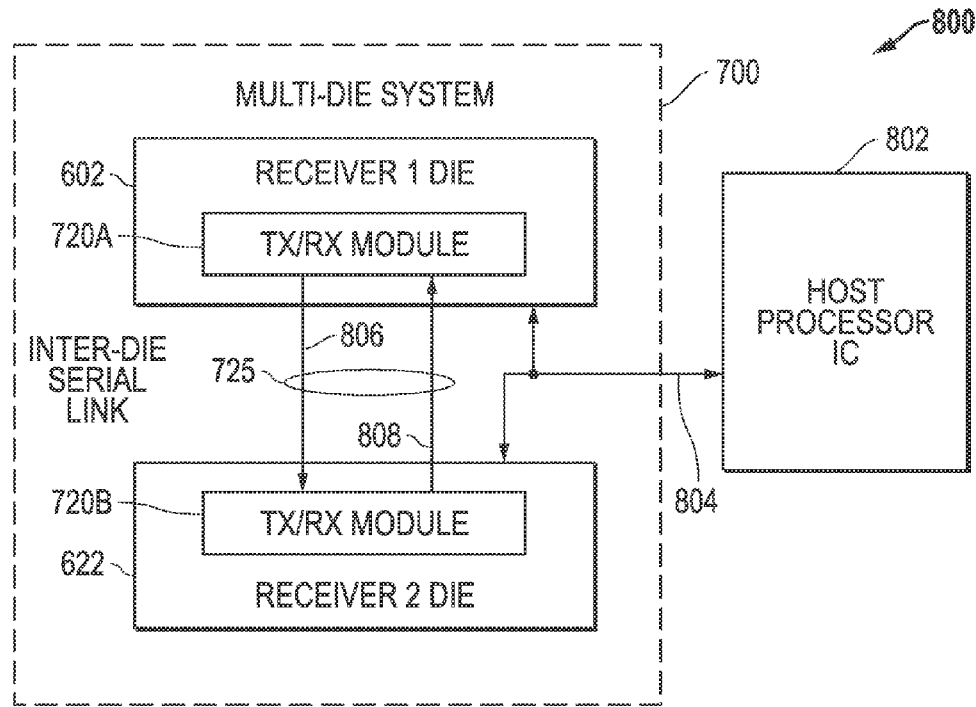
FIG. 8 is a block diagram of an example embodiment including a multi-receiver system implemented as a multi-die system connected to an external host processor integrated circuit.
Figure 9:
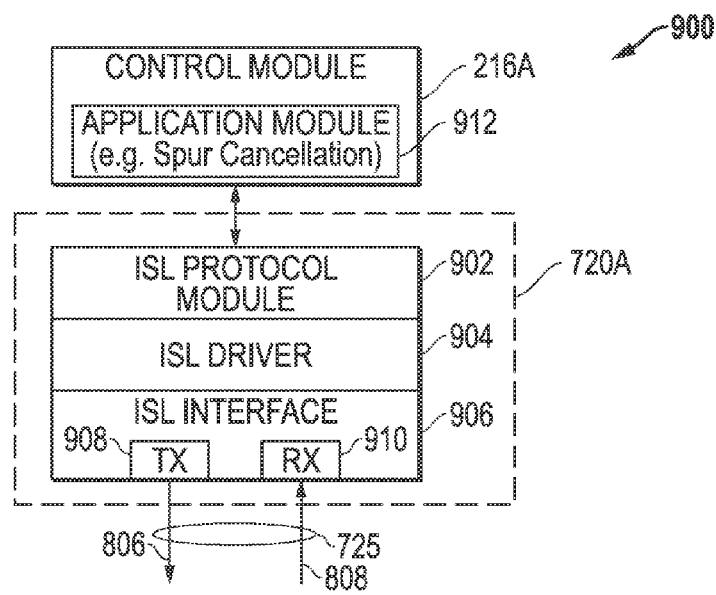
FIG. 9 is a block diagram of an example embodiment for a die-to-die communication link.
Figure 10:
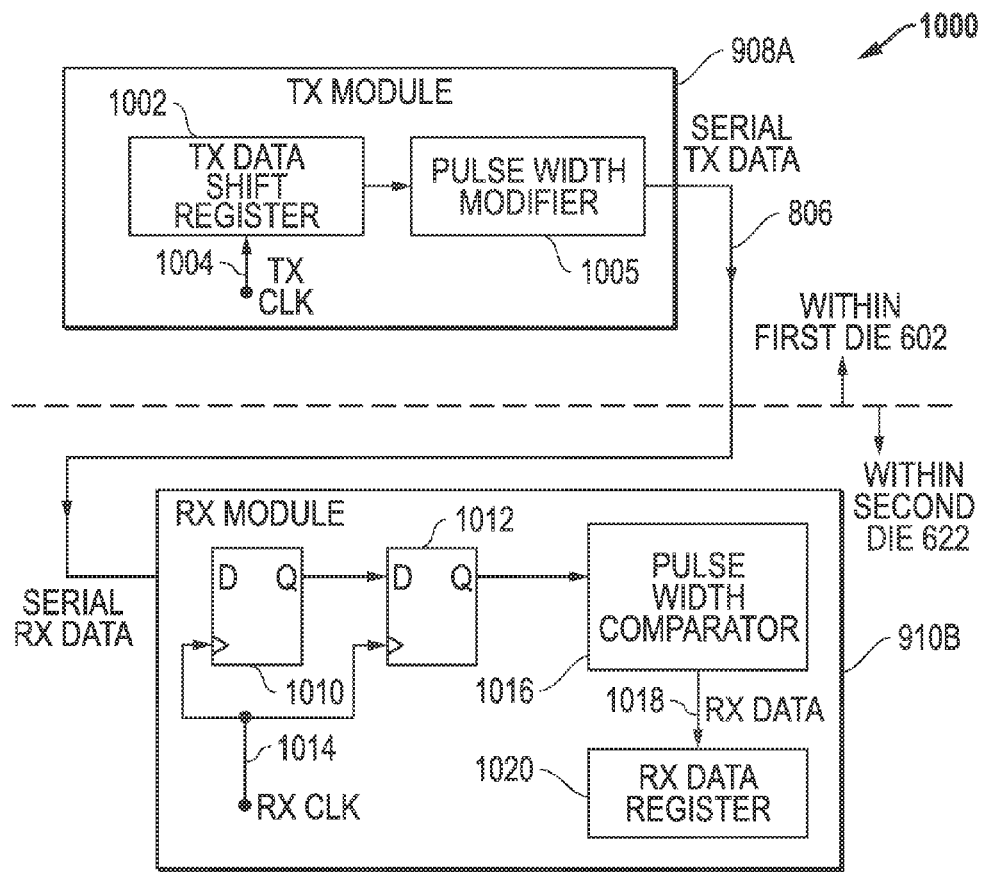
FIG. 10 is a block diagram of an example embodiment for transmit/receive circuitry and related connections between a transmit module in a first die and a receive module in a second die.
Figure 11:
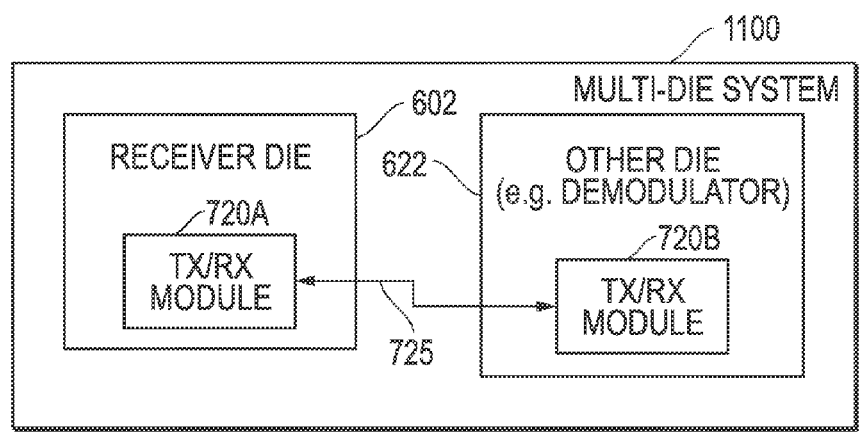
FIG. 11 is a block diagram of an example embodiment for a multi-die system where a first die is a receiver die and the second die is a non-receiver die such as a demodulator die.
Figure 12:
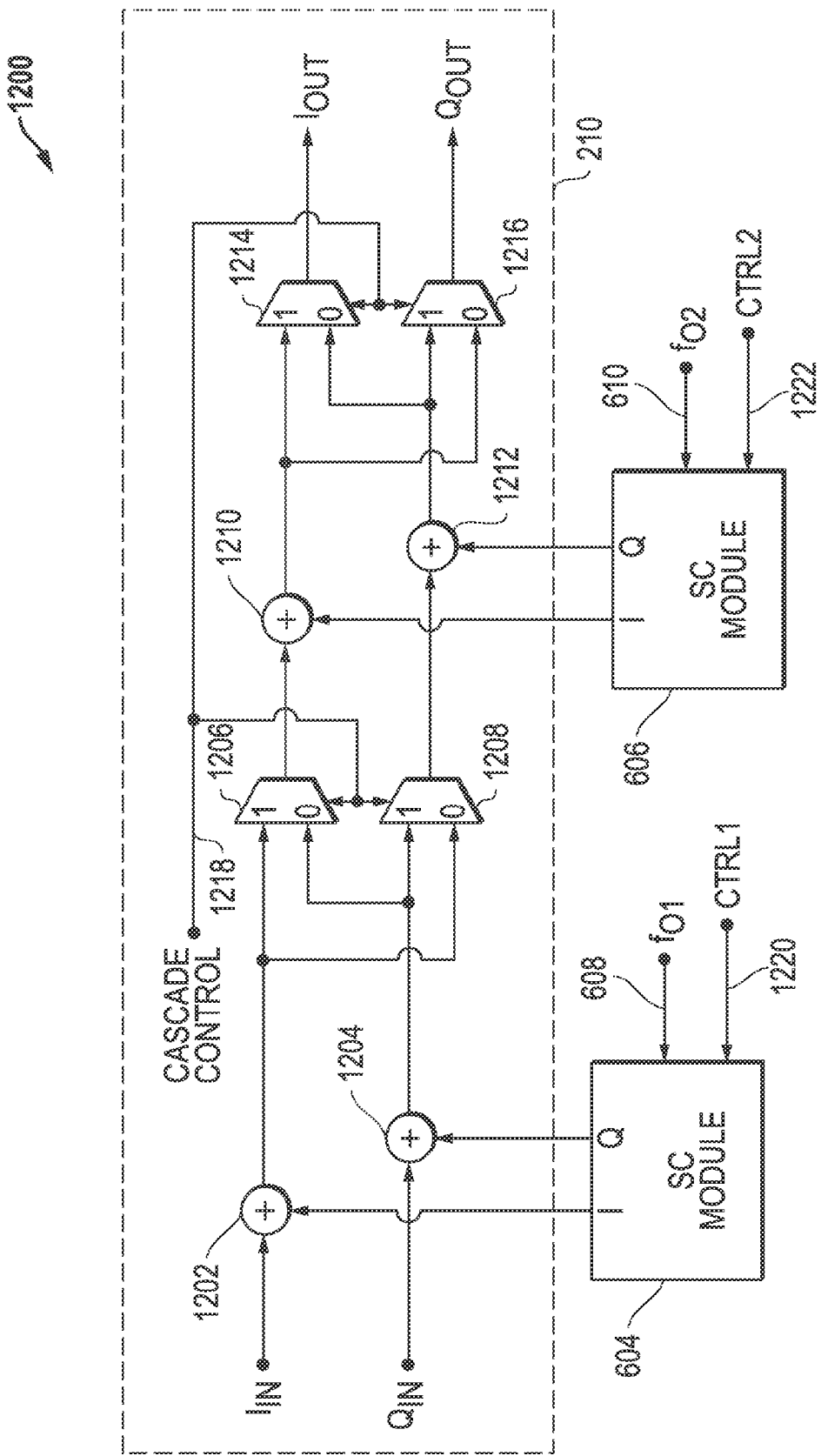
FIG. 12 is a block diagram of an example embodiment for two spur cancellation (SC) modules that operate in a cascaded relationship with respect to a digital processor.

Example embodiments are described in more detail below with respect to the drawings. FIGS. 1-5 provide example embodiments for receiver systems that include spur cancellation modules. FIGS. 6-7 provide example embodiments for multi-receiver systems including two receive paths having one or more spur cancellation modules. FIG. 8 provides an example embodiment for a multi-receiver system implemented as a multi-die system that includes transmit/receive modules within receiver integrated circuit dies that are connected together by a communication link FIGS. 9-10 provide example embodiments for the communication link and related transmit/receive circuitry. FIG. 11 provides an additional example embodiment for a receiver die and a non-receiver die within a multi-die system that are connected together through the die-to-die communication link. And FIG. 12 provides an example embodiment where two spur cancellation modules are cascaded within a receive path to provide two modes of operation. It is again noted that additional embodiments and variations could be implemented.

Figure 1:
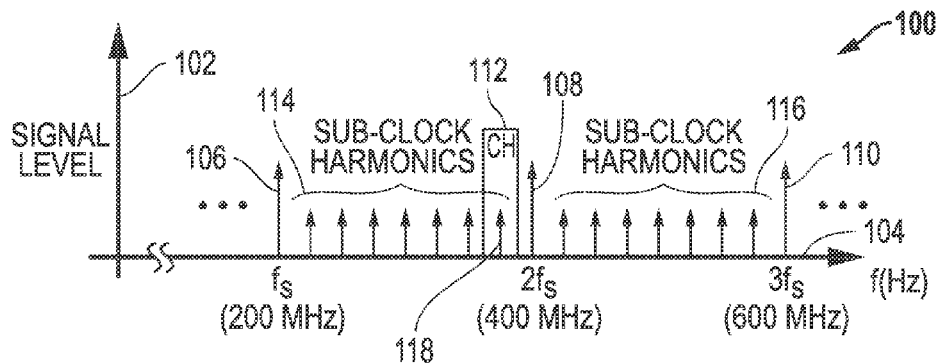
FIG. 1 is a diagram of an example embodiment for digital clock spurs for an example receive path having sub-clocks related to a sampling clock ($f_S$) for analog-to-digital conversion.

FIG. 1 is a diagram of an example embodiment 100 for digital clock spurs for an example receive path having sub-clocks related to a sampling clock ($f_S$) for analog-to-digital conversion. The x-axis 104 represents frequency in Hertz (Hz), and the y-axis represents a signal level. The sampling frequency ($f_S$) 106 is shown along with the second harmonic ($2f_S$) 108 and the third harmonic ($3f_S$) 110 for the sampling frequency ($f_S$). Higher harmonics would also exist. For embodiment 100, it is assumed that multiple digital sub-clocks have been generated for digital processing and are related to the sampling frequency ($f_S$) 106 by ½, ¼, and ⅛ of the sampling frequency ($f_S$) 106, although other dividers could be used as well. These sub-clocks will cause digital spur harmonics 114 between the sampling frequency ($f_S$) 106 and the second harmonic ($2f_S$) 108 and will also cause digital spur harmonics 116 between the second sampling frequency harmonic ($2f_S$) 108 and the third sampling frequency harmonic ($3f_S$) 110, as well as other harmonics that are not shown. Some of these digital clock spurs may fall within the frequency range for a channel being tuned. For example, channel (CH) 112 is a representative channel that has been selected to be tuned within a receive path, and one sub-clock harmonic 118 falls within this channel (CH) 112. This digital clock spur can adversely affect the received signal in this channel (CH) 112. As one example for particular values, if the sampling frequency ($f_S$) 106 is 200 MHz, the second harmonic ($2f_S$) 108 will fall at 400 MHz and the third harmonic ($3f_S$) 110 will fall at 600 MHz. If the digital sub-clocks are ½, ¼, and ⅛ of the sampling frequency ($f_S$) 106, these digital sub-clocks will then fall at 100 MHz, 50 MHz, and 25 MHz, respectively. Further, the harmonics for these digital sub-clocks will fall on the sampling clock harmonics and will also cause the sub-clock harmonics 114/116 that fall between the sampling clock harmonics.

Advantageously, the disclosed embodiments improve digital data obtained from received channels by effectively removing digital clock spurs, such as spur 118, that fall within a channel being processed within a receive path, such as channel (CH) 112. Spurs from other sources can similarly be removed by the disclosed embodiments. This removal is accomplished by determining what spurs will fall within a selected channel, utilizing a cancellation module to generate a spur cancellation signal, subtracting the spur cancellation signal from digital information being processed for the channel, and using feedback to adjust spur parameters, such as amplitude and phase values, for the spur cancellation signal. While the frequencies of digital clock spurs within a selected channel can be determined because the digital clock frequencies are known and the channel frequencies are known, the feedback is used to adjust the spur parameters (e.g., phase and amplitude) so that the spur cancellation signal will settle to steady state values that effectively remove the digital clock spur. If the spur frequency is not known precisely, digital feedback signals can also be used to adjust the frequency of the cancellation signal. It is further notated that if multiple spurs land within the channel, a cancellation signal can be generated for each of these spurs.

Figure 2:
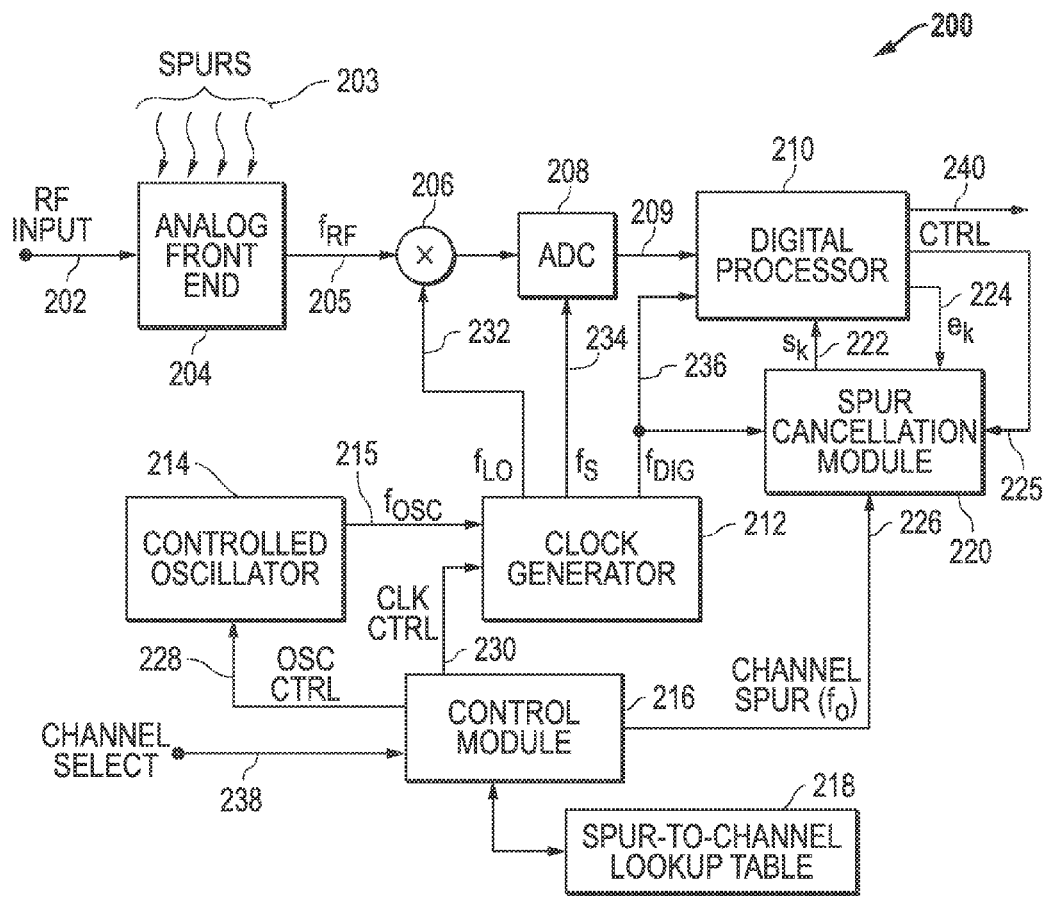
FIG. 2 is a block diagram of an example embodiment for an RF receiver that includes a spur cancellation module.

FIG. 2 is a block diagram of an example embodiment 200 for an RF receiver that includes a spur cancellation module 220. RF input signals 202 are received by an analog front end 204, which can include filters, low noise amplifiers, variable gain amplifiers, and/or other desired circuitry. The RF input signals can include, for example, channels within a broadcast spectrum, such as broadcast channels that include audio and/or video content. For television broadcasts, the RF input signals 202 can be received from a cable connection, a terrestrial antenna, a satellite receiver, and/or any other desired source. A mixer 206 receives RF signals ($f_{RF}$) 205 from the analog front end 204 and a local oscillator mixing signal ($f_{LO}$) 232 from clock generator 212. As described further below, the mixing signal ($f_{LO}$) 232 is determined by the channel select signal 238. The output of mixer 206 is a down-converted signal that centers a selected channel at a desired intermediate frequency (IF), low-IF, or zero IF, as desired, depending upon the architecture selected for the RF receiver. The analog-to-digital converter (ADC) 208 receives and digitizes the down-converted signal and then provides digital information 209 to the digital processor 210. The digital processor 210 digitally processes the digital information 209 and outputs digital data 240 representing content within the tuned channel.

The clock generator 212 generates the local oscillator mixing signal ($f_{LO}$) 232, the sampling clock ($f_S$) for the ADC 208, and a digital clock ($f_{DIG}$) 236 for the digital processor. Preferably, these three clock signals are related by divider or multiplier values and are all based upon a common oscillation signal ($f_{OSC}$) 215. A controlled oscillator 214, such as a voltage controlled oscillator, can be used to generate the common oscillation signal ($f_{OSC}$) 215. A control module 216 can be configured to provide oscillation control (OSC CTRL) signals 228 to the controlled oscillator 214 and clock control (CLK CTRL) signals 230 to the clock generator 212. As indicated above, the local oscillator mixing signal ($f_{LO}$) 232 is adjusted based upon the channel select signal 238 so that the RF signal ($f_{RF}$) is down-converted to a desired target frequency, such as an IF, low-IF, or zero-IF target frequency. It is further noted that the spur cancellation module 220 can also receive and use the digital clock ($f_{DIG}$) 236 for its operations. It is also noted that the controlled oscillator 214 can be a crystal oscillator that generates an oscillation signal 215, and the clock generator 212 can include one voltage controlled oscillator that uses the output of the crystal oscillator to provide an oscillation signal that is used to generate the local oscillator mixing signal ($f_{LO}$) 232 and another voltage controlled oscillator that uses the output of the crystal oscillator to provide an oscillation signal that is used to generate the sampling clock ($f_S$) for the ADC 208 and the digital clock ($f_{DIG}$) 236 for the digital processor. Other variations could also be implemented.

As shown with respect to FIG. 1, the digital clock signals generated by clock generator 212 and harmonics of these digital clock signals cause digital clock spurs 203 that can fall within the channel selected to be tuned and thereby potentially degrade digital data generated from this channel. The digital clock spurs 203 can also cause performance problems directly within the digital processing for the receive path, as well. Advantageously, the spur cancellation module 220 effectively removes these digital clock spurs by generating a spur cancellation signal ($s_k$) 222 that matches the frequency of a digital clock spur falling within the selected channel. The spur cancellation module 220 can also generation cancellation signals ($s_k$) 222 to remove spurs from sources other than digital clocks. This spur cancellation signal ($s_k$) 222 is provided to the digital processor 210, and the digital processor 210 subtracts it from digital information being processed for the received channel. A digital feedback signal ($e_k$) 224 is provided back to the spur cancellation module 220, and the spur cancellation module 220 uses this digital feedback signal ($e_k$) 224 to adjust spur parameters, such as the amplitude and phase for the spur cancellation signal ($s_k$) 222, to effectively remove the spur from the channel. It is noted that additional spur cancellation signals can be generated if multiple spurs are determined to fall within a channel being processed.

The control module 216 can be configured to determine which spurs including digital clock spurs will fall within a channel selected to be tuned or processed by the channel select signal 238. The control module 216 can then provide a nominal spur frequency ($f_0$) 226 to the spur cancellation module 220. This nominal spur frequency ($f_0$) 226 represents a spur, such as a digital clock spur, that will fall within the channel selected to be tuned, as described in more detail below. Because the digital clock frequencies generated by clock generator 212 and related harmonics can be pre-determined, a spur-to-channel lookup table 218 can be provided that identifies which digital clock spurs will fall within a selected channel. As such, the control module 216 can access the spur-to-channel lookup table 218 each time a new channel is selected by the channel select signal 238 to determine which digital clock spurs will fall within the selected channel. The spur-to-channel lookup table 218 can also be used to store information identifying other known spurs that will fall within channels that can be selected for tuning. The control module 216 can then provide the appropriate nominal spur frequency ($f_0$) 226 to the spur cancellation module 220 to indicate what spur cancellation signal should be generated.

It is noted that a wide variety of receive path architectures can be implemented while still utilizing the spur cancellation techniques described herein. For example, RF receivers, demodulators, and other receive path circuitry, modules, or processing blocks can utilize the disclosed embodiments. RF receivers can include dual down-conversion, low-IF down-conversion, direct down conversion, direct spectrum digitization without down conversion, and/or other desired receiver architectures that can be utilized for receiving RF input signals. It also is noted that the RF receiver 200 can be configured to receive channels within frequency bands across a wide range of frequencies, from thousands of Hertz to gigahertz frequencies and above. The content within the channels for the received frequency bands can include audio, video, data, and/or other desired content. Further, demodulators and/or other digital processors that process digital information associated with a selected channel with RF input signals can utilize the spur cancellation techniques and embodiments described herein.

Figure 3A:
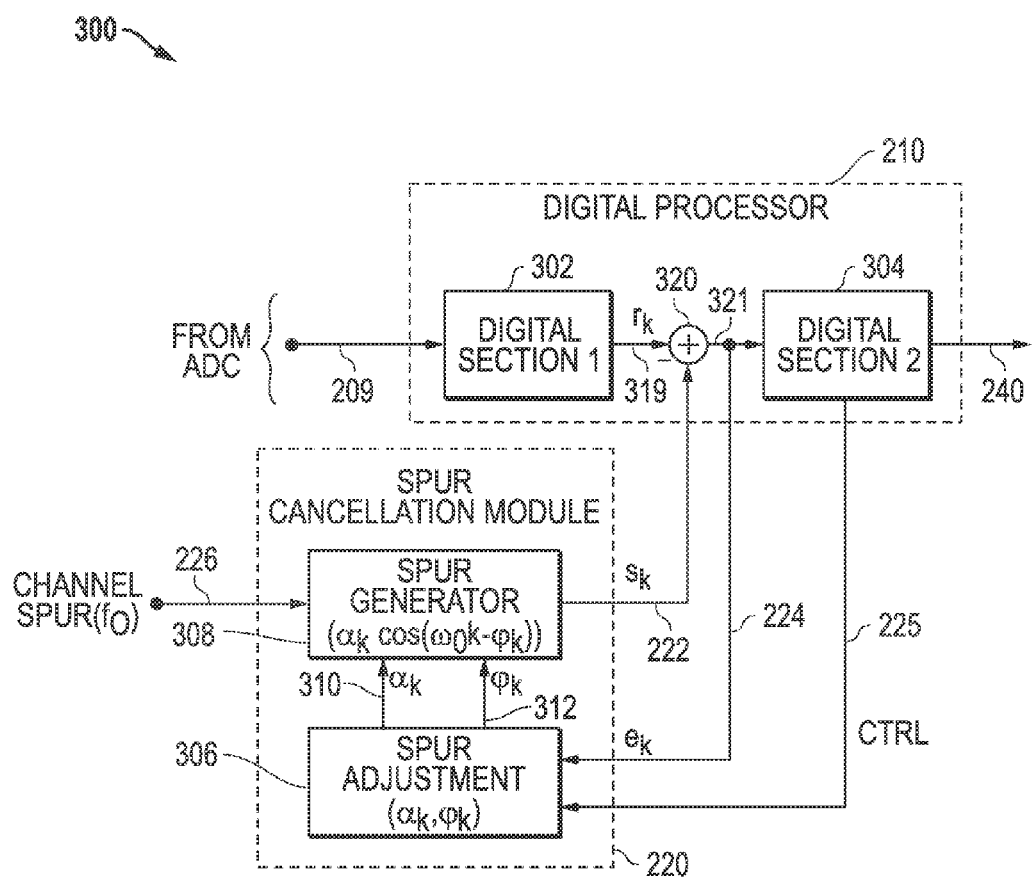
FIGS. 3A-B are block diagrams of example embodiments for a digital processor combined with a spur cancellation module.

FIG. 3A is a block diagram of a further example embodiment 300 for the digital processor 210 and the spur cancellation module 220. For the embodiment 300 depicted, the digital processor includes a digital combiner 320 that is positioned between a first digital section (SECTION1) 302 and a second digital section (SECTION2) 304. The first digital section 302 receives and processes the digital information 209 from the ADC 208. For example, the first digital section 302 can in part filter the digital information from the ADC 208. The output digital information ($r_k$) 319 is provided to the combiner 320 and will still include a spur, if one is present within the channel. The combiner 320 subtracts the spur cancellation signal ($s_k$) 222 from the digital information ($r_k$) 319 to output adjusted digital information 321. This adjusted digital information 321 provides the digital feedback signal ($e_k$) 224 for the spur cancellation module 220. The adjusted digital information 321 is also provided to the second digital section 304. The second digital section 304 further processes the adjusted digital information 321 and outputs the digital data 240. For example, the second digital section 304 can decimate, demodulate, and otherwise process the digital information 321 to produce digital data 240 associated with the channel being tuned. It is noted that the combiner 320 could also be positioned in different locations within the digital processor 210. It is further noted that the digital information 209 can be provided from a source other than an ADC 208, if desired.

For further embodiments, it is further noted that a control signal (CTRL) 225 can be provided to the spur adjustment module 306 from the second digital section (SECTION2) 304 to provide control or content information that can be used to adjust the adaptation speed of the spur adjustment module 306 or to start and/or stop the updates to the spur parameters. For example, in an analog television (TV) receiver, a demodulator could indicate blanking periods during which time no desired content is received. This indication could be used to increase the adaptation speed of the spur parameters because the desired signals will not interfere with the estimation of the undesired spur signal. In still further embodiments, the spur adjustment block 306 can be configured to stop adaptation or adjustment of the spur parameters, for example, until the control signal 225 indicates the presence of a blanking period. Further, the control signal 225 can start/stop the spur cancellation module by determining whether or not the spur cancellation module 220 generates a spur cancellation signal 222.

The spur cancellation module 220 includes spur generator 308 and spur adjustment module 306. The spur generator 308 receives the nominal spur frequency ($f_O$) 226 for a spur that has been determined to exist within the channel to be tuned. The nominal spur frequency ($f_O$) 226 can also be configured to represent the spur frequency after any down-conversion that has preceded the combiner 320. For example, for embodiment 200 of FIG. 2, if a channel were originally centered at 410 MHz, a spur were located at 412.5 MHz, and the mixing signal ($f_{LO}$) were 405 MHz, the channel would be down-converted by mixer 206 to a low-IF of 5 MHz, and the clock spur would be down-converted to 7.5 MHz (e.g., 412.5 MHz–405 MHz=7.5 MHz). For such an embodiment, the nominal spur frequency ($f_O$) would also be 7.5 MHz as it represents the frequency for the down-converted spur. It is noted that this example could be associated with television broadcast channels where the channel width is typically 6-8 MHz, and the broadcast band is in a range of 50 MHz to 1 GHz. The disclosed embodiments could also be used with other broadcast bands and channel widths as desired.

It is further noted that if the digital clocks, the local oscillator mixing signals, and the spur cancellation signal are generated from the same clock reference, any shift in the frequency of the clock reference due to imperfections or external conditions, such as temperature, also shifts the spur and the cancellation signal by the same amount. Advantageously, this similar shifting means that frequency adjustments or tracking is not necessary. However, if one of the these signals is configured to have a separate clock source, the frequency of the spur and the cancellation signal may drift apart thereby requiring frequency tracking in addition to or instead of phase tracking.

The spur generator 308 receives the nominal spur frequency ($f_O$) and generates a spur cancellation signal ($s_k$) 222 based upon the nominal spur frequency ($f_O$). As part of this process, intervening sampling and further digital decimation is also considered. As one example, the following equation can be used to generate the spur cancellation signal ($s_k$) 222.

$$s_k = \alpha_k \cos(\omega_0 k + \phi_k) \qquad \text{[EQUATION 1]}$$

For EQUATION 1, $\alpha_k$ represents an estimated amplitude value; $\phi_k$ represents an estimated phase value; and coo represents an angular frequency associated with the nominal spur frequency ($f_O$) and the intervening sampling frequency ($f_S$), which can be represented by the following equation.

$$\omega_0 = 2\pi(f_O/f_S) \qquad \text{[EQUATION 2]}$$

For EQUATION 2 and with respect to the embodiment 200 of FIG. 2, the nominal spur frequency ($f_O$) is the frequency of the spur once it has been down-converted by mixer 206, and the sampling frequency ($f_S$) is the sampling frequency ($f_S$) 234 for the ADC 208.

The spur adjustment module 306 initially provides estimates for the amplitude value ($\alpha_k$) 310 and the phase value ($\phi_k$) 312 to the spur generator 308 and then adjusts these values based upon the digital feedback signal ($e_k$) 224. In particular, the spur adjustment module 306 can be configured to analyze the digital feedback signal ($e_k$) 224 and to adjust the amplitude value ($\alpha_k$) 310 and the phase value ($\phi_k$) 312 over time in order to reduce and/or minimize the spur energy level at the nominal frequency ($f_O$) for the spur. In this way, the amplitude and phase for the spur cancellation signal ($s_k$) 222 are dynamically adjusted to steady state values to reduce and/or effectively eliminate the spur within the digital information being processed.

For further embodiments, it is noted that the amplitude could be adjusted alone, or the phase could be adjust alone, although adjusting both will likely achieve improved results. Furthermore, for cases where the spur frequency is not precisely known, the frequency for the spur cancellation signal could also be adjusted. As such, the frequency, amplitude, phase, or any combination thereof could be adjusted for the spur cancellation signal. It is noted that other parameters for the spur cancellation signal could also be adjusted in addition to or instead of frequency, amplitude, and/or phase. It is further noted that a LMS (least mean squares) algorithm can be used to calculate and adjust the spur parameters, if desired.

For example, the following equations can be used to generate the amplitude value ($\alpha_k$) 310 and the phase value ($\phi_k$) 312.

$$\alpha_k = \alpha_{k-1} + (M_\alpha)(e_k)\cos(\omega_0 k + \phi_k) \quad \text{[EQUATION 3]}$$

$$\phi_k = \phi_{k-1} - (M_\phi)(e_k)(\alpha_k)\sin(\omega_0 k + \phi_k) \quad \text{[EQUATION 4]}$$

For EQUATIONS 3-4, $M_\alpha$ represents the step size used to adjust the amplitude value ($\alpha_k$) 310, and $M_\phi$ represents the step size used to adjust the phase value ($\phi_k$) 312. It is noted that other methods and algorithms can be used to adjust the phase, amplitude and/or frequency values including but not limited to signed-LMS algorithms, signed-signed LMS algorithms, RLS (recursive least squares) algorithms, Steepest-decent algorithms, Kalman filtering, expectation maximization (EM), and/or other techniques.

It is further noted the spur cancellation module 220 can also be configured to further process the digital feedback signal ($e_k$) prior to using it to adjust spur parameters, such as generate and adjusting amplitude values and phase values. For example, the spur cancellation module 220 can be configured to apply a band-pass filter around the frequency of the spur being cancelled to improve convergence of the amplitude values and/or phase values. Other variations could also be implemented, as desired.

Figure 3B:
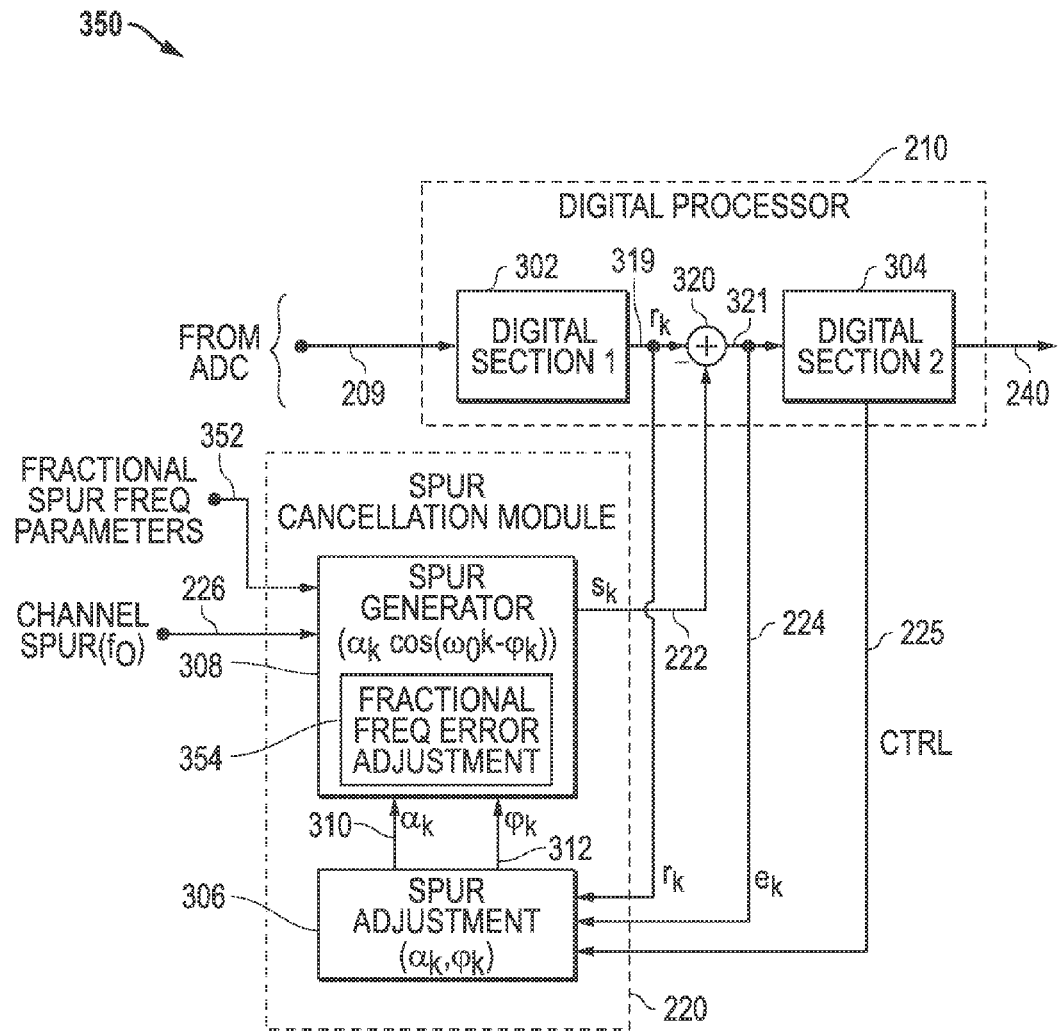

FIG. 3B is a block diagram of another example embodiment 350 including variations for the digital processor 210 and the spur cancellation module 220. In particular, the example embodiment 350 includes adjustments to the input signals received and used by spur adjustment block 306 and to the parameters and used received by spur generator 308. Otherwise, example embodiment 350 operates similar to embodiment 300 in FIG. 3A, as described above.

Looking to the spur adjustment block 306 for example embodiment 350, the spur adjustment block 206 now also receives the digital information ($r_k$) 319 that is input to the combiner 320. This digital information ($r_k$) 319 can be used to determine the phase value ($\phi_k$) 312, replacing the digital feedback signal ($e_k$) 224 in Equation 4 above. Further, the amplitude value amplitude value ($\alpha_k$) can be removed from the phase determination provided by Equation 4, as well. As such, the following equation can be used instead of Equation 4 above to generate the phase value ($\phi_k$) 312, if desired.

$$\phi_k = \phi_{k-1} - (M_\phi)(r_k)\sin(\omega_0 k + \phi_k) \quad \text{[EQUATION 5]}$$

For EQUATION 5 and similar to EQUATIONS 4 above, $M_\phi$ represents the step size used to adjust the phase value ($\phi_k$) 312. It is again noted that other methods and algorithms can be used to adjust the phase, amplitude and/or frequency values including but not limited to signed-LMS algorithms, signed-signed LMS algorithms, RLS (recursive least squares) algorithms, Steepest-decent algorithms, Kalman filtering, expectation maximization (EM), and/or other techniques.

Looking to the spur generator 308 for example embodiment 350, a fractional frequency error adjustment module 354 is now included within the spur generator 308 and uses fractional spur frequency parameters 352 to adjust for fractional errors in determining the nominal spur frequency ($f_0$) 226. These fractional spur frequency parameters 352 can be provided by the control module 216 along with the nominal spur frequency ($f_0$) 226. For example, the control module 216 can determine the spur frequency ($f_0$) 226 to be cancelled based upon the spur-to-channel lookup table 218 and/or by otherwise determining a frequency to be cancelled by the spur cancellation module 220. In one embodiment, the spur frequency ($f_0$) 226 can be determined using a ratio (A/B) associated with divider values used to generate the oscillator frequency ($f_{OSC}$) 215. In addition to providing the nominal spur frequency ($f_0$) 226 that corresponds to the ratio A/B to the spur generator 208, the control module 216 can also provide the parameter value B and the remainder value for A/B. The fractional frequency error adjustment block 354 can then accumulate the remainder values over time and adjust the ratio value A/B by one every time the accumulation becomes larger than the parameter value B. The accumulator can then reset so that the remainders can again be accumulated. As such, adjustments can be made for fractional errors within the determination of the nominal spur frequency ($f_0$) 226 by the control module 216.

Figure 4:
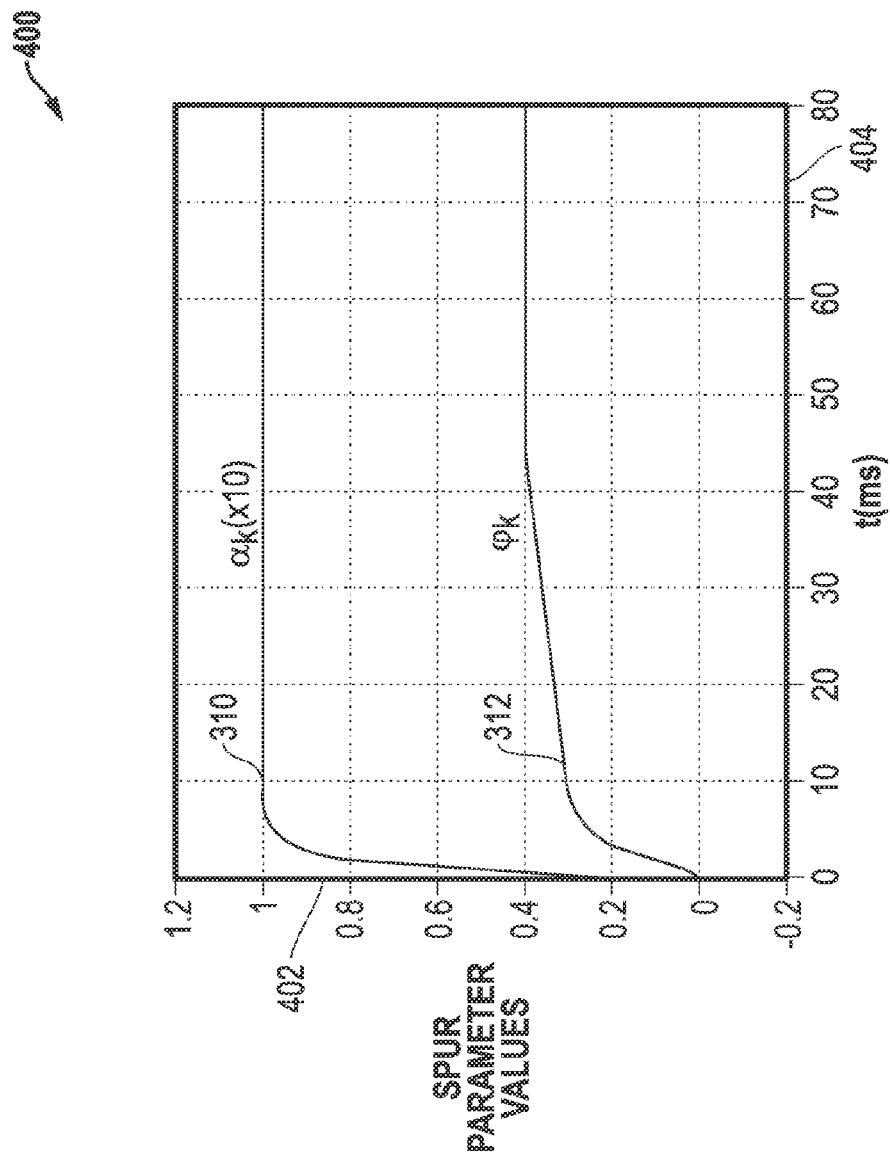
FIG. 4 is a diagram of an example embodiment for representative adjustments over time to an amplitude value ($\alpha_k$) and a phase value ($\phi_k$) for a spur cancellation signal.

FIG. 4 is a diagram of an example embodiment 400 for representative adjustments to the amplitude value ($\alpha_k$) 310 and the phase value ($\phi_k$) 312 over time for a spur cancellation signal ($s_k$) 222. The y-axis represents the parameter value, and the x-axis represents time in milliseconds (ms). It is noted that the values for the amplitude value ($\alpha_k$) 310 are 10-times (×10) the values indicated in the graph so as to make it easier to depict them along with the example values for the phase value ($\phi_k$) 312. For embodiment 400, the amplitude value ($\alpha_k$) 310 is initially set to 1.0 (i.e., 0.1 from graph times 10) and will converge to a steady state value, such as 10.0 (i.e., 1.0 from graph times ten), due to the operation of the spur adjustment module 306. The phase value ($\phi_k$) 312 is initially set to zero and will converge to a steady state value, such as 0.4, due to the operation of the spur adjustment module 306. It is noted that the actual steady state values will depend upon the energy level and phase of the actual spur falling within a selected channel during operation.

Figure 5:
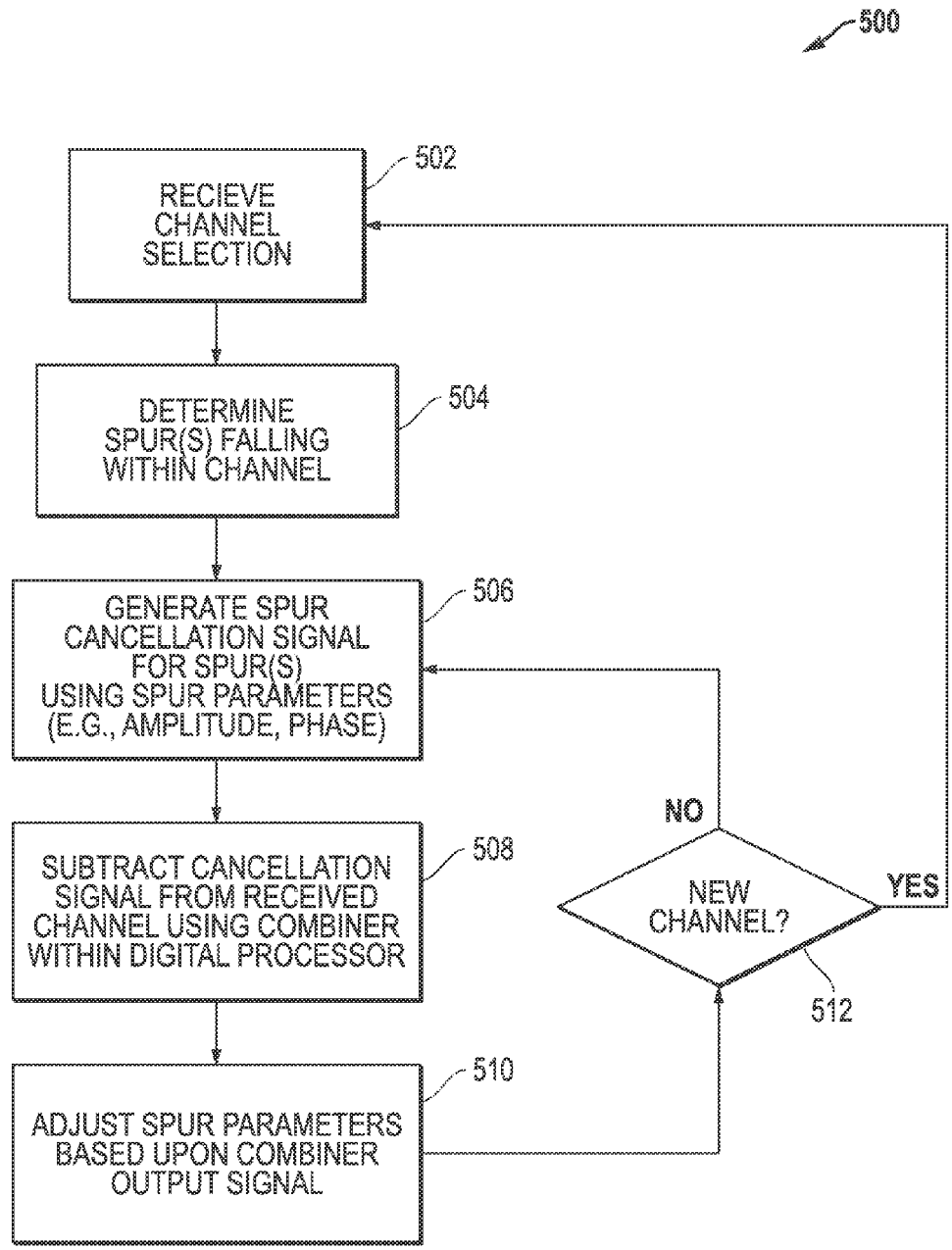
FIG. 5 is a flow diagram of an embodiment for providing spur cancellation.

FIG. 5 is a flow diagram of an embodiment 500 for providing spur cancellation. In block 502, a channel selection is received indicating a channel to be processed. In block 504, a determination is made whether one or more spurs (e.g., digital clock spurs), if any, will fall within the frequency range for the selected channel to be tuned. In block 506, a spur cancellation signal for a spur within the channel is then generated using spur parameters, such as for example, the amplitude value and/or the phase value described above. In block 508, the spur cancellation signal is subtracted from the digital information for the received channel using a combiner within the digital processor. In block 510, the spur parameters are adjusted based upon the output signal from the combiner. Flow then passes to block 512, where a determination is made if a new channel has been selected. If "NO," then flow passes back to block 506 where the spur cancellation signal is again generated. As described above, the adjustments to the spur parameters will converge to steady state values. If "YES," then flow passes back to block 502 where information identifying a new channel selection can be received.

While the embodiments described herein can be utilized for embodiments having a single receive path, the embodiments described herein are particularly useful for addressing digital clock spurs for systems having multiple receive paths. For example, additional receive paths on the same integrated circuit or within a multi-chip package increase the complexity of handling digital clock spurs as the receive paths can be using different digital clock frequencies to tune to different channels. Advantageously, multiple versions of the spur cancellation modules described herein can be used to remove spurs caused by these additional digital clocks. For example, if a plurality of different receive paths are provided within an integrated circuit or multi-chip package, a plurality of different spur cancellation modules can be used within each receive path to remove the digital clock spurs caused by that receive path and digital clock spurs caused by each of the other receive paths. Further, the different receive paths can communicate to each other any changes to the digital clock frequencies for each of the receive paths, and these changes can be tracked and updated so that the spur cancellation modules within each of the receive paths can be adjusted accordingly. In addition, the different receive paths can utilize a single common oscillation signal, such as a crystal reference frequency, to generate digital clocks utilized within the different receive paths. Still further, the base digital clock frequencies for each of the receive paths can be selected to be sufficiently far apart as to separate the spurs generated by each of the receive paths. Other variations could also be implemented.

FIG. 6 is a block diagram of an example embodiment for a multi-receiver system 600 that includes two receive paths 602/622 and utilizes the spur cancellation techniques described herein. The first RF receive path 602 and the second RF receive path 622 can be, for example, integrated within a single integrated circuit or packaged within a single multi-chip package to form the multi-receiver system 600. Other multiple receive path configurations could also be utilized. The first RF receive path 602 includes a first spur cancellation module 220A, a first digital processor 210A, and a first clock generator 212A that generates a first mixing signal ($f_{LO1}$), a first sampling clock ($f_{S1}$), and a first digital clock ($f_{DIG1}$) that can be utilized by the first RF receive path 602 as described above with respect to the embodiments of FIGS. 2-5. Similarly, the second RF receive path 622 includes a second spur cancellation module 220B, a second digital processor 210B, and a second clock generator 212B that generates a second mixing signal ($f_{LO2}$), a second sampling clock ($f_{S2}$), and a second digital clock ($f_{DIG2}$) that can be utilized by the second receive path 622 as described above with respect to the embodiments of FIGS. 2-5. It is noted that for the embodiment depicted, the first receive path 602 and the second receive path 622 utilize a common shared controlled oscillator 214, which provides a common oscillation signal ($f_{OSC}$) 215 to both receive paths. However, it is understood that each receive path could also have its own controlled oscillator and/or use a different oscillation signal for its digital clocks, if desired. It is also again noted that the controlled oscillator 214 can be a crystal oscillator that generates an oscillation signal 215, and the clock generators 212A/212B can include one voltage controlled oscillator that uses the output of the crystal oscillator to provide an oscillation signal that is used to generate the local oscillator mixing signals ($f_{LO1}$, $f_{LO2}$) and another voltage controlled oscillator that uses the output of the crystal oscillator to provide an oscillation signal that is used to generate the sampling clocks ($f_{S1}$, $f_{S2}$) and the digital clocks ($f_{DIG1}$, $f_{DIG2}$) for the digital processors 210A/210B. Other variations can also be implemented.

Because there are multiple digital clock generators 212A/212B and multiple digital processors 210A/210B operating in the multi-receiver system 600, there are multiple sets of digital clock spurs that are preferably addressed within each receive path 602/622. As shown, each of the RF receive paths 602/622 include two spur cancellation (SC) module blocks within each spur cancellation module 220A/220B with one being used to generate spur cancellation signals associated with the digital clocks (CLK1) for the first receive path and with the other being used to generate spur cancellation signals associated with the digital clocks (CLK2) for the second receive path. Thus, the first receive path 602 includes a first SC module 604 that receives a first nominal spur frequency ($f_{O1A}$) 608 and generates a first spur cancellation signal (skin) 612. The first receive path 602 also includes a second SC module 606 that receives a second nominal spur frequency ($f_{O2A}$) 610 and generates a second spur cancellation signal ($s_{k2A}$) 614. Similarly, the second receive path 622 includes a first SC module 624 that receives a first nominal spur frequency ($f_{O1B}$) 628 and generates a first spur cancellation signal ($s_{k1B}$) 632. The second receive path 622 also includes a second SC module 626 that receives a second nominal spur frequency ($f_{O2B}$) 630 and generates a second spur cancellation signal ($s_{k2B}$) 634. The nominal spur frequencies ($f_{O1A}$, $f_{O2A}$) 608/610 for the first receive path 602 and the nominal spur frequencies ($f_{O1B}$, $f_{O2B}$) 628/630 for the second receive path 622 can be generated by a shared control module 216, if desired, although each receive path could also have its own control module. Further, each of the SC module blocks 604/606/624/626 can be implemented as described herein with respect to spur cancellation module 220 in FIGS. 2-3.

For embodiment 600 and similar to embodiment 200 of FIG. 2, the control module 216 can be used to provide clock control signals (CLK1 CTRL) 230A to the clock generator 212A for the first RF receive path 602 and to provide clock control signals (CLK2 CTRL) 230B to the clock generator 212B for the second RF receive path 622. Further, to determine the appropriate nominal spur frequencies to provide to the spur cancellation modules, the control module 216 can utilize a spur-to-channel lookup table 218 that includes first lookup information 640 for the digital clocks (CLK1) within the first receive path 602 and second lookup information 642 for the digital clocks (CLK2) within the second receive path 622. The control module 216 can also receive a first channel select signal 238A that determines the channel to be tuned by the first RF receive path 602 and a second channel select signal 238B that determines the channel to be tuned by the second RF receive path 622. The control module 216 can also provide other control signals to the receive paths 602/622, if desired, and can provide an oscillator control signal 228 to the shared controlled oscillator 214. It is again noted that the control module 216 and/or the lookup table 218 can be distributed within each receive paths 602/622, if desired, rather than utilizing a common control module and a common lookup table. Other variations could also be implemented while still utilizing the spur cancellation module embodiments described herein.

FIG. 7 is a block diagram of an example embodiment 700 for a multi-receiver system where the receive paths 602/622 are separated as represented by dashed line 705 and where a communication link 725 is used to communicate operating parameters between the two receive paths 602/622. For example embodiment 700, each of the receive paths 602/622 includes a separate control module 216A/216B and a separate lookup table 218A/218B, as well as a separate controlled oscillator 214A/214B. For the first RF receive path 602, the SC modules 604/606, the digital processor 210A, and the clock generator 212A operate as described above with respect to FIG. 6, and other receive path circuitry shown with respect to FIG. 2 is also included within the first RF receive path 602. Similarly, for the second RF receive path 622, the SC modules 624/626, the digital processor 210B, and the clock generator 212B operate as described above with respect to FIG. 6, and other receive path circuitry shown with respect to FIG. 2 is also included within the second RF receive path 622. However, in contrast with embodiment 600 in FIG. 6, the first RF receive path 602 now includes a separate lookup table 218A, control module 216A, and controlled oscillator 214A. The first RF receive path 602 also includes a transmit/receive (TX/RX) module 720A that communicates operating parameters to and from a TX/RX module 720B within the second RF receive path 622. The second RF receive path 622 also includes a separate lookup table 218B, control module 216B, and controlled oscillator 214B. The second RF receive path 622 also includes a transmit/receive (TX/RX) module 720B that communicates operating parameters to and from the TX/RX module 720A within the first RF receive path 602. The TX/RX modules 720A/720B communicate with each other through communication link 725.

In operation, the first controlled oscillator 216A receives the first channel select signal 238A and provides the first oscillator control signals (OSC1 CTRL) 228A to the first controlled oscillator (OSC1) 214A and provides first clock control signals (CKL1 CTRL) 230A to the first clock generator (CLK1) 212A. The controlled oscillator (OSC1) 214A outputs the first oscillation frequency ($f_{OSC1}$) 215A to the first clock generator 212A, and the first clock generator 212A uses this first oscillation frequency ($f_{OSC1}$) 215A to generate its output clock signals. The control module 216A also receives operating parameters, such as spur related parameters and channel selection information, associated with the second receive path 622 through the communication link 725. As indicated above, the nominal spur frequencies ($f_{O1A}$, $f_{O2A}$) 608/610 for the spur cancellation (SC) modules 604/606 within the first receive path 602 can be generated by the first control module 216A for the first receive path 602. In addition, the first control module 216A can access the first spur-to-channel lookup table 218A to identify one or more clock frequencies 640A/642A associated with channel selection information 238A/238B for the receive paths 602/622, if desired. As described herein, the spur cancellation (SC) modules 604/606 are used to reduce or cancel spur frequencies interfering with the channel information being received and tuned by the first RF receive path 602. Further, it is again noted that one or more spur cancellation (SC) modules can be used within the first receive path 602 although the embodiment 700 provides two SC modules 604/606. It is also again noted that the controlled oscillators 214A/B can be one or more crystal oscillators that generate oscillation signals 215A/B, and the clock generators 212A/B can include one voltage controlled oscillator that uses the output of the crystal oscillator to provide an oscillation signal that is used to generate the local oscillator mixing signal ($f_{LO1}$, $f_{LO2}$) and another voltage controlled oscillator that uses the output of the crystal oscillator to provide an oscillation signal that is used to generate the sampling clocks ($f_{S1}$, $f_{S2}$) and the digital clocks ($f_{DIG1}$, $f_{DIG2}$) for the digital processor. Other variations could also be implemented.

In operation, the second controlled oscillator 216B receives the second channel select signal 238B and provides the second oscillator control signals (OSC2 CTRL) 228B to the second controlled oscillator (OSC2) 214B and provides second clock control signals (CKL2 CTRL) 230B to the second clock generator (CLK2) 212B. The controlled oscillator (OSC2) 214B outputs the second oscillation frequency ($f_{OSC2}$) 215B to the second clock generator 212B, and the second clock generator 212B uses this second oscillation frequency ($f_{OSC2}$) 215B to generate its output clock signals. The control module 216B also receives operating parameters, such as spur related parameters and channel selection information, associated with the first receive path 602 through the communication link 725. As indicated above, the nominal spur frequencies ($f_{O1B}$, $f_{O2B}$) 628/630 for the spur cancellation (SC) modules 624/626 within the second receive path 622 can be generated by the second control module 216B for the second receive path 622. In addition, the first control module 216A can access the first spur-to-channel lookup table 218A to identify one or more clock frequencies 640A/642A associated with channel selection information 238A/238B for the receive paths 602/622, if desired. As described herein, the spur cancellation (SC) modules 624/626 are used to reduce or cancel spur frequencies interfering with the channel information being received and tuned by the second RF receive path 622. Further, it is again noted that one or more spur cancellation (SC) modules can be used within the second receive path 622 although the embodiment 700 provides two SC modules 624/626. Other variations could also be implemented.

It is further noted that the first receive path 602 is configured to receive a first RF input signal and to generate a tuned digital signal representing content of the channel within the first RF input signal that was selected by the first channel select signal 238A. It is further noted that the second receive path 622 is configured to receive a second RF input signal and to generate a tuned digital signal representing content of the channel within the second RF input signal that was selected by the second channel select signal 238B. The first RF input signal and the second RF input signal can be different RF signals such as from two different RF input antennas, or the first RF input signal and the second RF input signal can be the same RF signal such as from a single RF input antenna. Other variations can also be implemented.

FIG. 8 is a block diagram of an example embodiment 800 including a multi-receiver system 700 implemented as a multi-die system connected to an external host processor integrated circuit (IC) 802. For example embodiment 800, a first receiver die (RECEIVER1) 602 and a second receiver die (RECEIVER2) 622 are connected to communicate with each other through communication link 725, as described above. Further, each of the receiver dies 602/622 can be implemented as shown above for the first and second receive paths 602/622 within FIG. 7. For embodiment 800, the communication link 725 is implemented as an inter-die serial communication link including a serial connection 806 from the TX/RX module 720A within the first receiver die 602 to the TX/RX module 720B within the second receiver die 622. The communication link 725 also includes a serial connection 808 from the TX/RX module 720B within the second receiver die 622 to the TX/RX module 720A within the first receiver die 602. Although serial communication links 806/808 are shown as uni-directional serial connections, other communication links could also be used such as bi-directional serial connections, uni-directional parallel connections, bi-directional parallel connections, and/or other desired communication links. As also shown for example embodiment 800, the host processor IC 802 communicates with the multi-chip module and the receiver dies 602/604 through communication link 804. This communication link 804 can utilize one or more output pins or connections for the multi-die system.

It is noted that a variety of integrated circuit package configurations can be utilized. For example, in one configuration the first receiver die 602 can be within first integrated circuit package; the second receiver die 622 can be within a second integrated circuit package; and the communication link 725 can include one or more electrical connections between the two integrated circuit packages. In another configuration the first integrated circuit die 602 and the second integrated circuit die 622 can be implemented as a multi-chip module (MCM) that includes two or more integrated circuit dies within a single integrated circuit package, and the communication link 725 can be implemented as one or more electrical connections between the integrated circuit dies within the MCM package itself. It is further noted that while two integrated circuit dies are shown in FIG. 8, additional integrated circuit dies could also be used within the multi-die system along with additional electrical connections and/or integrated circuit packages. Other variations could also be implemented.

As described herein, the die-to-die communication link 725 is used to communicate operating parameters between a receiver integrated circuit die and another integrated circuit die within the multi-die system 700. These operating parameters can be include any of a wide variety of information communicated between the integrated circuit dies without host intervention thereby providing for quicker turnaround time and simpler system design. These operating parameters are then used by the receiving die to adjust its own operation to facilitate system performance. For the example embodiment of FIG. 8 where receiver dies are included within the multi-die system 700, the operational information communicated through die-to-die communication link 725 can include, for example, the following:

(1) oscillation tuning frequency information to identify the oscillation frequencies (e.g., OSC1, OSC2) that are provided to the controlled oscillators 214A/214B so that the receive paths 602/622 can select their oscillation frequencies to be far enough apart so as to avoid generating interfering spurs for the other receive path 602/622;

(2) oscillation tuning frequency information to adjust for oscillator pulling effects due to the operation of the controlled oscillators 214A/214B;

(3) local oscillator (LO) mixing frequency information (e.g., $f_{LO1}$, $f_{LO2}$) to identify LO frequencies that are selected for the receive paths 602/622 so that the receive paths 602/622 can avoid local oscillation (LO) coupling and spurs by changing the LO frequencies (e.g., $f_{LO}$, $f_{LO2}$) to prevent or reduce any harmonic frequencies from landing in the desired band of the other receive path 602/622;

(4) clock frequency information to identify frequency planning and digital clock spurs within one receive path 602/622, such as generated clock frequencies (e.g., $f_{DIG1}$, $f_{DIG2}$), clock frequencies derived from generated clock frequencies, parameters used to generate clock frequencies, and/or other clock frequency related information, to allow for adjustments to clock controlled oscillators, frequency generators, and/or other functional blocks within the other receive path 602/622 in order to avoid interfering spurs;

(5) spur frequency information and related parameters to identify digital clock spurs and/or other spurs generated or expected to be generated within the receive paths 602/622 so that the spur cancellation (SC) modules 608/610/628/630 can be used to remove or reduce the spurs;

(6) strobe or trigger timing information (e.g., vertical synchronization (VSYNC) signals within a video transmission) to identify timing events that can be used to synchronize operations between receive paths 602/622; and/or (7) other operating parameter information related to the operation of the receive paths 602/622 that can be shared and used by the receive paths to facilitate the operation of the multi-die system and thereby improve system performance.

For a multi-die system embodiment 800 including two receiver dies 602/622 that each have at least one spur cancellation module 604/624, therefore, each receiver die 602/622 can adjust its spur cancellation module(s) 608/610/628/630 to cancel spurs generated or expected to be generated by the other receiver die based upon the operating parameters communicated through the die-to-die communication link 725. For example, when the each receiver die 602/622 receives a channel selection signal 238A/238B to tune to a new channel within the RF signal, the changing receiver die 602/622 communicates the channel information through the communication link 725 to the other receiver die 602/622. As such, when one receiver die is being tuned to a new channel that places a spur within an active channel currently being tuned by a second receiver die, the second receiver die can use the channel selection information communicated through the die-to-die communication link 725 to identify the spur and the cancel it using one or more of its spur cancellation modules. Further, the changing receiver die can send the channel information prior to making the change to its own tuned channel in order to allow the non-changing receiver die to have additional time to adjust its spur cancellation module to cancel the spur that will be generated after the change in channel for the changing receiver die. Still further, information can be communicated by the receiver dies 602/622 during times that content information (e.g., audio and/or video content) is not being transmitted within the received signal. For example, where analog television (ATV) channels are being received and tuned, communications through the communication link 725 can be configured to occur during the vertical synchronization (VSYNC) portions of the received ATV information. These VSYNC portions typically pre-cede the video content within each received symbol for the ATV content. For such an embodiment, the vertical sync start/end information for the receiver dies 602/622 can also be communicated across the communication link 725 so that each receiver die 602/622 will know the timing events for the VSYNC of the other die. Other variations could also be implemented.

The die-to-die communication link 725 can also be used to communicate a wide variety of information between a receiver die 602/622 and another non-receiver die within a multi-die system, such as a demodulator die having one or more demodulators. For example, one die containing receive path 602 can communicate through the die-to-die communication link 725 with another die containing a demodulator configured to demodulate tuned digital signals output by the receive path die 602. The modulated data within a channel being tuned by the receive path die 602 can be, for example, MPEG encoded data within a video data stream. For such a receiver-to-demodulator environment, control information can be operating parameters communicated between the receive path die 602 and the demodulator die. For example, the demodulator die can communicate AGC (automatic gain control) control information through the die-to-die communication link 725, and this AGC control information can then be used by the receive path die 602 to adjust the gain provided by AGC circuitry to received signals within the receive path die 602. The AGC control information can also be based upon operating parameters determined within the demodulator die, such as a bit error rate (BER) measured within the demodulator die for demodulated data associated with the tuned digital data being output by the receive path die 602. It is also noted that FIG. 11 below provides an example embodiment for a multi-die system including a receiver die and a demodulator die.

FIG. 9 is a block diagram of an example embodiment 900 including a communication link 725, transmit/receive (TX/RX) module 720A, and control module 216A for the first receiver die 602 of FIG. 8. For the example embodiment 900, an inter-die serial link (ISL) interface 906 includes transmit (TX) circuitry 908 that is coupled to the serial transmit connection 806 and receiver (RX) circuitry 910 that is coupled to the serial receive connection 808 for the communication link 725. An ISL driver 904 provides for control of the ISL interface 906 by an ISL protocol module 902. The ISL protocol module 902 in turn communicates with an application module 912 within the control module 216A. The application module 912 can provide control processing for a functional feature of the receiver die 602 such as the spur cancellation modules described herein. The control module 216A also provides control signals to additional circuitry and functional blocks within the receiver path for the first receiver die 602, as described above. It is noted that the transmit/receiver (TX/RX) module 720B and the control module 216B within the second receiver die 622 of FIG. 8 can be similarly implemented. It is also again noted that communication link 725 could be implemented differently from the uni-directional serial connections shown for example embodiment 900 while still taking advantage of the die-to-die communication links described herein.

FIG. 10 is a block diagram of an example embodiment 1000 for transmit/receive circuitry and related connections between transmit (TX) module 908A within a first die 602 and receive (RX) module 910B within a second die 622. Within the transmit (TX) module 908A, transmit data is stored within a shift register 1002. This transmit data is then shifted out of shift register 1002 using a transmit (TX) clock 1004. Because the transmit clock 1004 used for transmit (TX) module 908A can be different from the receive (RX) clock 1014 used for receive (RX) module 910B, the transmit (TX) data output by shift register 1002 can be modified by pulse width modifier 1005 such that logic "1" values have a different pulse width from logic "0" values. For one example embodiment, logic "1" values can have twice the pulse width as logic "0" values, although other pulse width variations could also be used. The resulting pulse-width-modified serial transmit (TX) data is transmitted through connection 806 to the receive (RX) module 910B where it becomes serial receive (RX) data. D flip-flops 1010 and 1012 are used in combination with a pulse width comparator 1016 to provide receive (RX) data 1018 that is stored within the receive (RX) data register 1020. The D flip-flop 1010 receives the serial receive (RX) data from the connection 806 as its data (D) input, and D flip-flop 1010 outputs the logic state of this D input as its output (Q) data based upon the receive (RX) clock 1014. The D flip-flop 1012 receives the Q output from D flip-flop 1010 as its data (D) input, and D flip-flop 1012 outputs the logic state of this D input as its output (Q) data based upon the receive (RX) clock 1014. The Q output of D flip-flop 1012 is provided to the pulse width comparator 1016, which in turn operates to output a logic "1" or logic "0" based upon the duration of the voltage pulses within the received data. It is noted that the transmit clock (TX) 1004 and the receive clock (RX) 1014 will likely be different because they are generated separately within the first die 602 and the second die 622. For example, these clock signals can be based upon internal variable sampling clocks (e.g., 190-207 MHz sampling clocks) for analog-to-digital conversion circuitry with the two dies 602/622. It is further noted that a receive module within the first die 602 and a transmit module within the second die 622 can be implemented similarly to embodiment 1000 to provide the connection 808 shown in FIG. 9.

FIG. 11 is a block diagram of an example embodiment for a multi-die system 1100 where a first die 602 is a receiver die and the second die is a non-receiver die 622 such as a demodulator die. As described above, the first die 602 includes a TX/RX module 720A, and the second die 622 also includes a TX/RX module 622. As such, operating parameters associated with the operation of the receiver die 602 can be communicated as desired to the second die 622 through communication link 725, and operating parameters associated with the operation of the second die 622 can be communicated as desired to the first die 602 through inter-die communication link 725. As described herein, a variety of operating parameter information can be communicated as desired using the die-to-die communication link 725 without requiring intervention by an external host integrated circuit. It is further noted that a receiver and a demodulator can be included within the same die, and the receiver/demodulator die can communicate operating parameters with other integrated circuit dies, such as other receiver dies, other receiver/demodulator dies, other demodulator dies, and/or dies containing other functional circuitry. Other variations can also be implemented.

FIG. 12 is a block diagram of an example embodiment 1200 for two spur cancellation (SC) modules 604 and 606 that operate in a cascaded relationship with respect to a digital processor 210. For the embodiment 1200, the digital input signals are provided as a quadrature signal having a real input signal component ($I_{IN}$) and an imaginary input signal component ($Q_{IN}$) that are ninety degrees out of phase with respect to each other. The first SC module 604 receives a first nominal spur frequency ($f_{o1}$) 608 and a first control signal (CTRL1) 1220, and the second SC module 606 receives a second nominal spur frequency ($f_{o2}$) 610 and a second control signal (CTRL2) 1222. The first SC module 604 generates an I-path spur cancellation signal to I-path digital combiner 1202 and a Q-path spur cancellation signal to the Q-path digital combiner 1204. The second SC module 606 generates an I-path spur cancellation signal to I-path digital combiner 1210 and a Q-path spur cancellation signal to the Q-path digital combiner 1212. Multiplexers 1206, 1208, 1214, and 1216 are also coupled within the digital I/Q signal path within the digital processor 210 and receive the cascade control signal 1218. In operation, the multiplexers 1206, 1208, 1214, and 1216 are controlled to provide for two modes of operation. In a first mode of operation, the two SC modules 604/606 are used to cancel two separate spurs. In a second mode of operation, the two SC modules 604/606 are used to cancel a single spur and to compensate for imbalances within the I and Q spur levels due to I/Q imbalances within the receive path circuitry.

For the first mode of operation, the first nominal spur frequency ($f_{o1}$) 608 and the second nominal spur frequency ($f_{o2}$) 610 along with the control signals 1220/1222 are configured to cause the two SC modules 604/606 to cancel two separate spurs. The cascade control signal 1218 is set to allow I and Q signal components to pass directly through the digital combiners 1202/1204/1210/1212 to provide the real output signal component ($I_{OUT}$) and the imaginary output signal component ($Q_{OUT}$). For the example embodiment 1200, the cascade control signal 1218 is set so that the multiplexers 1206, 1208, 1214, and 1216 pass the "1" input signals to their respective outputs, although it is noted that alternative implementations could also be used to provide this direct I/Q path cascade operation in the first mode.

For the second mode of operation, the first nominal spur frequency ($f_{o1}$) 608 and the second nominal spur frequency ($f_{o2}$) 610 represent a single spur, and the control signals 1220/1222 are configured to cause the second SC module 606 to adjust for I/Q path imbalances within the SC module 604. It is also assumed that a similar imbalance exists within the second SC module 606. As such, by flipping the I/Q signal components, the two SC modules 604/606 can operate together to compensate for imbalances within the I/Q paths. For this second mode of operation, the cascade control signal 1218 is set so that the I and Q signal components are flipped or swapped at each set of multiplexers. As such, the digital combiner 1210 will receive the Q-path output from digital signal combiner 1204, and the digital combiner 1212 will receive the I-path output from the digital combiner 1202. The output of digital combiner 1212 then provides the real output signal component ($I_{OUT}$) through multiplexer 1214, and the output of digital combiner 1210 provides the imaginary output signal component ($Q_{OUT}$) through multiplexer 1216. For the example embodiment 1200, the cascade control signal

1218 is set so that the multiplexers 1206, 1208, 1214, and 1216 pass the "0" input signals to their respective outputs, although it is noted that alternative implementations could also be used to provide this swapped I/Q path cascade operation in the second mode.

It is noted that the functional blocks described herein can be implemented using hardware, software, or a combination of hardware and software, as desired. In addition, one or more processors or other processing devices running software and/or firmware can also be used, as desired, to implement the disclosed embodiments. It is further understood that one or more of the operations, tasks, functions, or methodologies described herein may be implemented, for example, as software or firmware and/or other program instructions that are embodied in one or more non-transitory tangible computer readable mediums (e.g., memory storage devices, FLASH memory, random access memory, read only memory, programmable memory devices, reprogrammable storage devices, hard drives, floppy disks, DVDs, CD-ROMs, and/or any other tangible storage medium) and that are executed by one or more controllers, microcontrollers, microprocessors, hardware accelerators, processors, and/or other processing devices to perform the operations and functions described herein. It is further understood, therefore, that one or more of the tasks, functions, or methodologies described herein may be implemented, for example, as software or firmware and/or other instructions embodied in one or more non-transitory tangible computer readable mediums that are executed by a CPU (central processing unit), controller, microcontroller, processor, microprocessor, FPGA (field programmable gate array), CPLD (complex configurable logic device), CLD (configurable logic device), ASIC (application specific integrated circuit), or other suitable processing device or combination of such processing devices.

Further modifications and alternative embodiments will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the example embodiments. Various changes may be made in the implementations and architectures described herein. For example, equivalent elements may be substituted for those illustrated and described herein, and certain features of the embodiments may be utilized independently of the use of other features, as would be apparent to one skilled in the art after having the benefit of this description.

What is claimed is:

1. A multi-die system having die-to-die communications, comprising:
a first integrated circuit die, comprising:
a radio frequency (RF) input configured to receive an RF input signal;
receive path circuitry coupled to receive the RF input signal and configured to generate a tuned digital signal representing content of a channel within the RF input signal based upon a channel selection signal, the receive path circuitry including analog front end circuitry and digital circuitry;
a spur cancellation module within the digital circuitry configured to generate one or more spur cancellation signals for the receive path circuitry;
a control module configured to provide one or more control signals to the spur cancellation module; and
a first inter-die transmit and receive module configured to receive one or more operating parameters from a second integrated circuit die;
wherein the control module is further configured to adjust the one or more control signals for the spur cancellation module based upon the one or more operating parameters; and
a second integrated circuit die, comprising:
a second inter-die transmit and receive module configured to communicate the one or more operating parameters to the first inter-die transmit and receive module.

2. The multi-die system of claim 1, wherein the first integrated circuit die is included within a first integrated circuit package, wherein the second integrated circuit die is included within a second integrated circuit package, and wherein the first and second inter-die transmit and receive modules are coupled to each other through one or more electrical connections between the first and second integrated circuit packages.

3. The multi-die system of claim 1, wherein the first and second integrated circuit dies are within a single multi-chip module, and wherein the first and second inter-die transmit and receive modules are coupled to each other through one or more electrical connections within the multi-chip module.

4. The multi-die system of claim 1, wherein the first integrated circuit die further comprises:
a clock generator configured to generate one or more clock signals for the receive path circuitry based upon an oscillation signal; and
wherein the first inter-die transmit and receive module is configured to communicate one or more operating parameters to the second inter-die transmit and receive module; and
wherein the second integrated circuit die further comprises:
a second RF input configured to receive a second RF input signal;
second receive path circuitry coupled to receive the second RF input signal and configured to generate a second tuned digital signal representing content of a channel within the second RF input signal based upon a second channel selection signal, the second receive path circuitry including second analog front end circuitry and second digital circuitry;
a second clock generator configured to generate one or more second clock signals for the second receive path circuitry based upon a second oscillation signal;
a second spur cancellation module within the second digital circuitry configured to generate one or more second spur cancellation signals for the second receive path circuitry; and
a second control module configured to provide one or more second control signals to the second spur cancellation module;
wherein the second inter-die transmit and receive module is configured to receive the one or more operating parameters from the first integrated circuit die, and the second control module is further configured to adjust the one or more second control signals for the second spur cancellation module based upon the one or more operating parameters from the first integrated circuit die.

5. The multi-die system of claim 4, wherein the one or more operating parameters for each of the first and second integrated circuit dies comprises at least one of channel selection information, clock frequency information for the first and second clock generators, or oscillation frequency information for the oscillation signals.

6. The multi-die system of claim 4, wherein the receive path circuitry and the second receive path circuitry are configured for analog video signals, and wherein the one or more operating parameters for each of the first and second integrated circuit dies comprises vertical synchronization information.

7. The multi-die system of claim 4, wherein the RF input signal and the second RF input signal are the same.

8. The multi-die system of claim 4, further comprising a first serial connection from the first inter-die transmit and receive module to the second inter-die transmit and receive module and a second serial connection from the second inter-die transmit and receive module to the first inter-die transmit and receive module.

9. The multi-die system of claim 4, further comprising at least one bi-directional serial connection between the first inter-die transmit and receive module and the second inter-die transmit and receive module.

10. The multi-die system of claim 4, wherein the first and second integrated circuit dies each comprises a plurality of spur cancellation modules.

11. The multi-die system of claim 1, wherein the first integrated circuit die comprises a plurality of cascaded spur cancellation modules.

12. The multi-die system of claim 11, wherein the plurality of cascaded cancellation modules are configured to operate in a first mode of operation to cancel two spur frequencies or in a second mode of operation to cancel one spur frequency and adjust for real and imaginary path imbalances in spur levels.

13. The multi-die system of claim 1, wherein the second integrated circuit die comprises at least one demodulator; and the one or more operating parameters comprise one or more control signals generated by the demodulator integrated circuit die based upon operation of the demodulator.

14. A method for die-to-die communication within a multi-die system, comprising:
at a first integrated circuit die:
  receiving an RF input signal and a channel select signal;
  generating with receive path circuitry a tuned digital signal representing content of a channel within the RF input signal based upon the channel selection signal, the receive path circuitry including analog front end circuitry and digital circuitry;
  generating one or more spur cancellation signals for the receive path circuitry using at least one spur cancellation module within the digital circuitry;
  providing one or more control signals to the spur cancellation module;
  receiving with first inter-die transmit and receive module one or more operating parameters from a second integrated circuit die; and
  adjusting the control signals provided to the spur cancellation module based upon the one or more operating parameters; and
at a second integrated circuit die:
  communicating with a second inter-die transmit and receive module the one or more operating parameters to the first inter-die transmit and receive module.

15. The method of claim 14, wherein the first integrated circuit die is included within a first integrated circuit package, wherein the second integrated circuit die is included within a second integrated circuit package, and wherein the first and second inter-die transmit and receive modules communicate through one or more electrical connections between the first and second integrated circuit packages.

16. The method of claim 14, wherein the first and second integrated circuit dies are within a single multi-chip module, and wherein the first and second inter-die transmit and receive modules communicate with each other through one or more electrical connections within the multi-chip module.

17. The method of claim 14, further comprising:
at the first integrated circuit die:
  generating one or more clock signals for the receive path circuitry based upon an oscillation signal; and
  communicating with the first inter-die transmit and receive module one or more operating parameters to the second inter-die transmit and receive module; and
at the second integrated circuit die:
  receiving a second RF input signal and a second channel select signal;
  generating with second receive path circuitry a second tuned digital signal representing content of a second channel within the second RF input signal based upon the second channel selection signal, the second receive path circuitry including second analog front end circuitry and second digital circuitry;
  generating one or more second clock signals for the second receive path circuitry based upon a second oscillation signal;
  generating one or more second spur cancellation signals for the second receive path circuitry using at least one second spur cancellation module within the second digital circuitry;
  providing one or more second control signals to the second spur cancellation module;
  receiving with the second inter-die transmit and receive module operating parameters from a first integrated circuit die; and
  adjusting the second control signals provided to the second spur cancellation module based upon the one or more operating parameters from the first integrated circuit die.

18. The method of claim 17, wherein the one or more operating parameters for each of the first and second integrated circuit dies comprises at least one of channel selection information, clock frequency information for the first and second clock generators, or oscillation frequency information for the oscillation signals.

19. The method of claim 17, wherein the receive path circuitry and second receive path circuitry output tuned video channels, and wherein the one or more operating parameters for each of the first and second integrated circuit dies comprises vertical synchronization information.

20. The method of claim 17, wherein the RF input signal and the second RF input signal are the same.

21. The method of claim 17, wherein the first and second integrated circuit dies each comprises a plurality of spur cancellation modules.

22. The method of claim 14, wherein the first integrated circuit die comprises a plurality of cascaded spur cancellation modules.

23. The method of claim 22, further comprising selectably operating the plurality of cascaded cancellation modules in a first mode of operation to cancel two spur frequencies or in a second mode of operation to cancel one spur frequency and adjust for real and imaginary path imbalances in spur levels.

24. The method of claim 14, wherein the second integrated circuit die comprises at least one demodulator, and further comprising communicating one or more control signals generated by the demodulator integrated circuit die based upon operation of the demodulator as the one or more operating parameters.

* * * * *